United States Patent
Kub et al.

(10) Patent No.: US 10,317,210 B2
(45) Date of Patent: Jun. 11, 2019

(54) WHOLE ANGLE MEMS GYROSCOPE ON HEXAGONAL CRYSTAL SUBSTRATE

(71) Applicants: THE CHARLES STARK DRAPER LABORATORY, INC., Cambridge, MA (US); THE UNITED STATES OF AMERICA, AS REPRESENTED BY THE SECRETARY OF THE NAVY, Washington, DC (US)

(72) Inventors: Francis J. Kub, Arnold, MD (US); Karl D. Hobart, Alexandria, VA (US); Eugene Imhoff, Washington, DC (US); Rachael Myers-Ward, Springfield, VA (US); Eugene H. Cook, Acton, MA (US); Marc S. Weinberg, Needham, MA (US); Jonathan J. Bernstein, Medfield, MA (US)

(73) Assignees: THE CHARLES STARK DRAPER LABORATORY, INC., Cambridge, MA (US); The United States of America, as represented by the Secretary of the Navy, Washington, DC (US)

(*) Notice: Subject to any disclaimer, the term of this patent is extended or adjusted under 35 U.S.C. 154(b) by 136 days.

(21) Appl. No.: 15/160,433

(22) Filed: May 20, 2016

(65) Prior Publication Data
US 2016/0341552 A1 Nov. 24, 2016

Related U.S. Application Data

(60) Provisional application No. 62/302,474, filed on Mar. 2, 2016, provisional application No. 62/165,365, filed on May 22, 2015.

(51) Int. Cl.
G01C 19/5684 (2012.01)

(52) U.S. Cl.
CPC .............................. *G01C 19/5684* (2013.01)

(58) Field of Classification Search
CPC ........................ G01C 19/5684; G01C 19/574
USPC ...................................................... 73/504.12
See application file for complete search history.

(56) References Cited

U.S. PATENT DOCUMENTS

| 7,318,347 | B2 | 1/2008 | Lynch et al. | |
|---|---|---|---|---|
| 7,360,423 | B2* | 4/2008 | Ayazi | G01C 19/5677 73/504.12 |
| 8,166,816 | B2* | 5/2012 | Ayazi | G01C 19/5698 73/504.01 |
| 8,322,213 | B2 | 12/2012 | Trusov et al. | |

(Continued)

OTHER PUBLICATIONS

B. J. Gallacher, et al., "Electrostatic correction of structural imperfections present in a microring gyroscope," Microelectromechanical Systems, Journal of, vol. 14, pp. 221-234, 2005.

*Primary Examiner* — John E Chapman, Jr.
(74) *Attorney, Agent, or Firm* — Lando & Anastasi, LLP

(57) ABSTRACT

According to one aspect, embodiments herein provide a gyroscope comprising an axially symmetric structure, and a plurality of transducers, each configured to perform at least one of driving and sensing motion of the axially symmetric structure, wherein the plurality of transducers is configured to drive the axially symmetric structure in at least a first vibratory mode and a second vibratory mode, and wherein the gyroscope is implemented on a hexagonal crystal-based substrate.

32 Claims, 31 Drawing Sheets

(56) References Cited

U.S. PATENT DOCUMENTS

| | | |
|---|---|---|
| 8,429,970 B2 | 4/2013 | Rocchi |
| 8,479,575 B2 | 7/2013 | Kempe |
| 9,551,577 B2 * | 1/2017 | Ruohio .............. G01C 19/5712 |

* cited by examiner

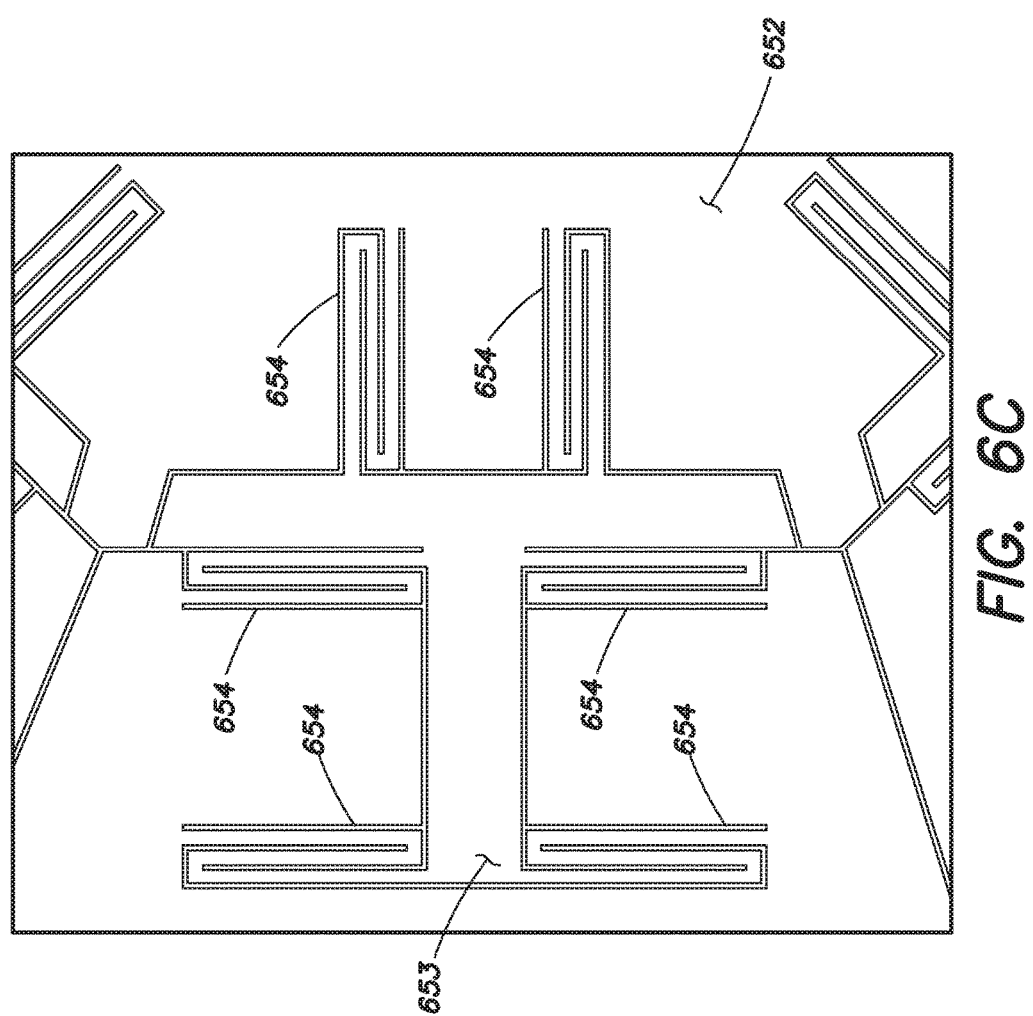

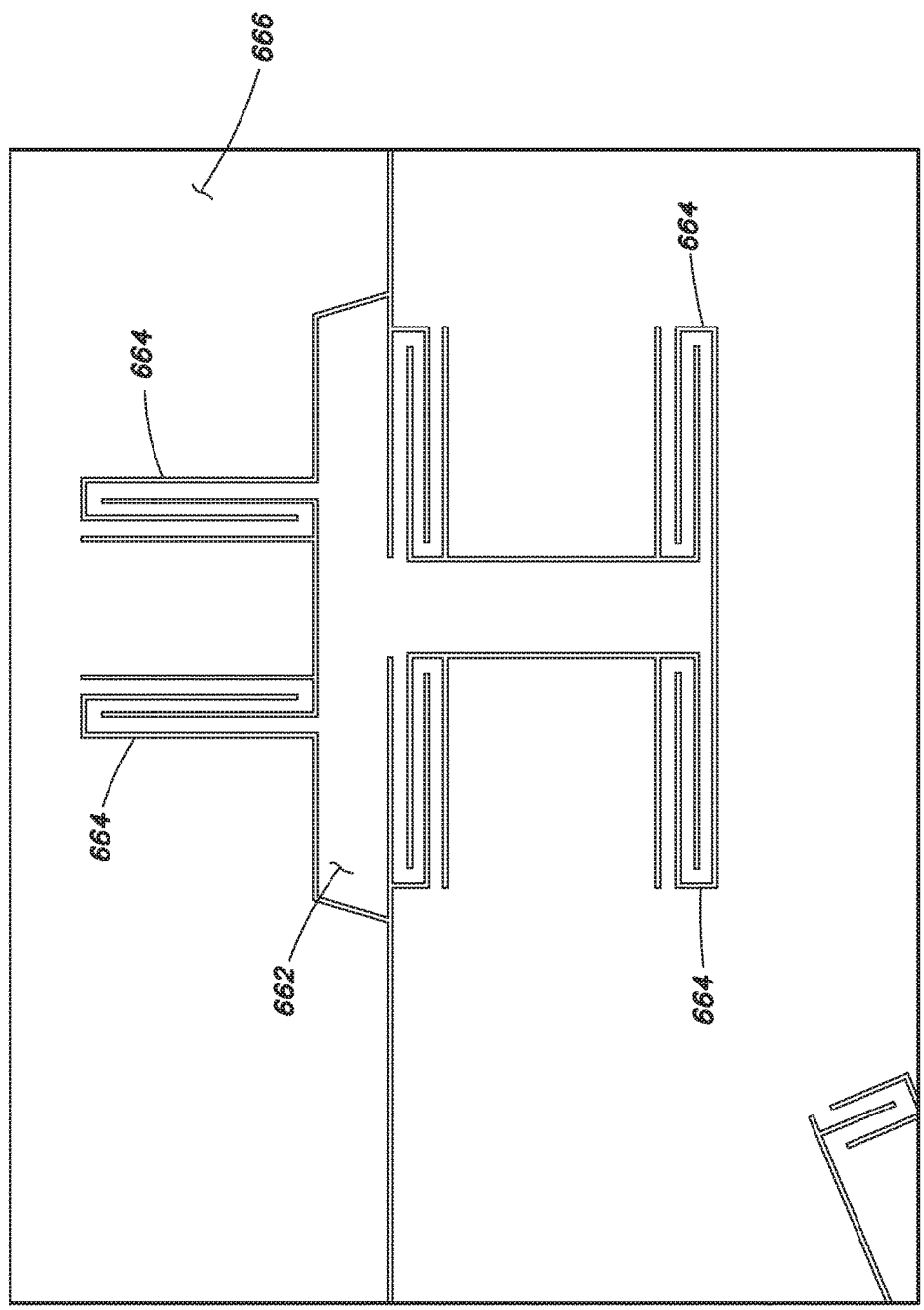

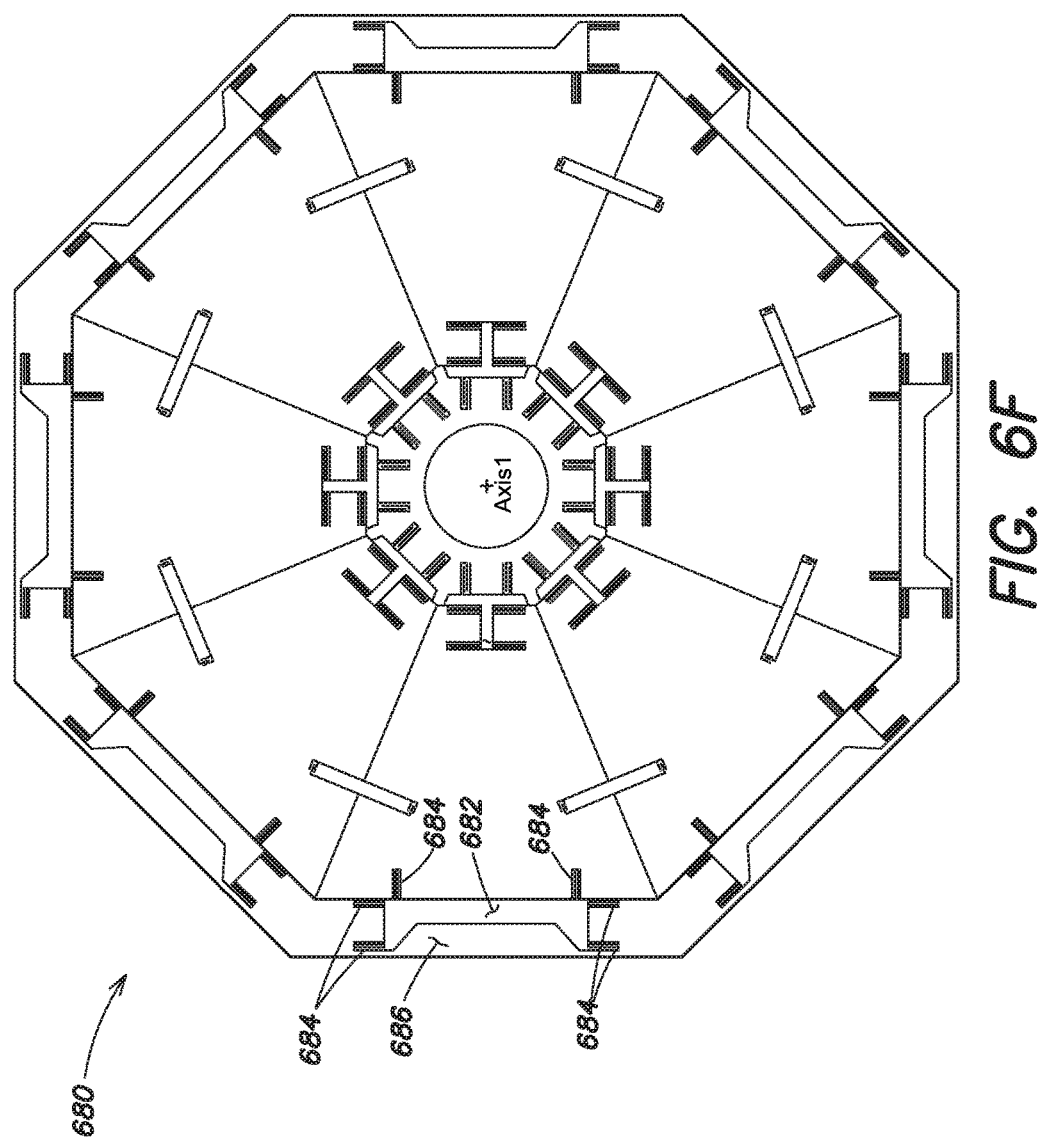

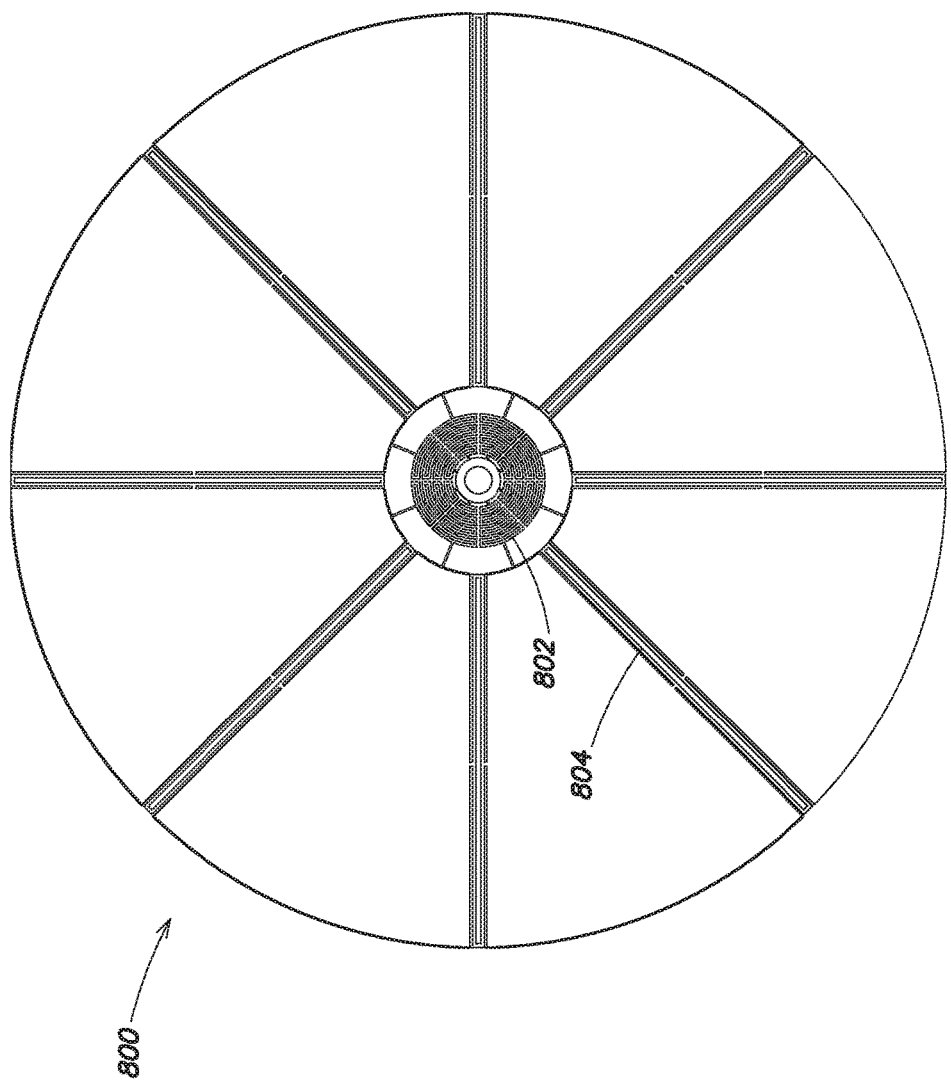

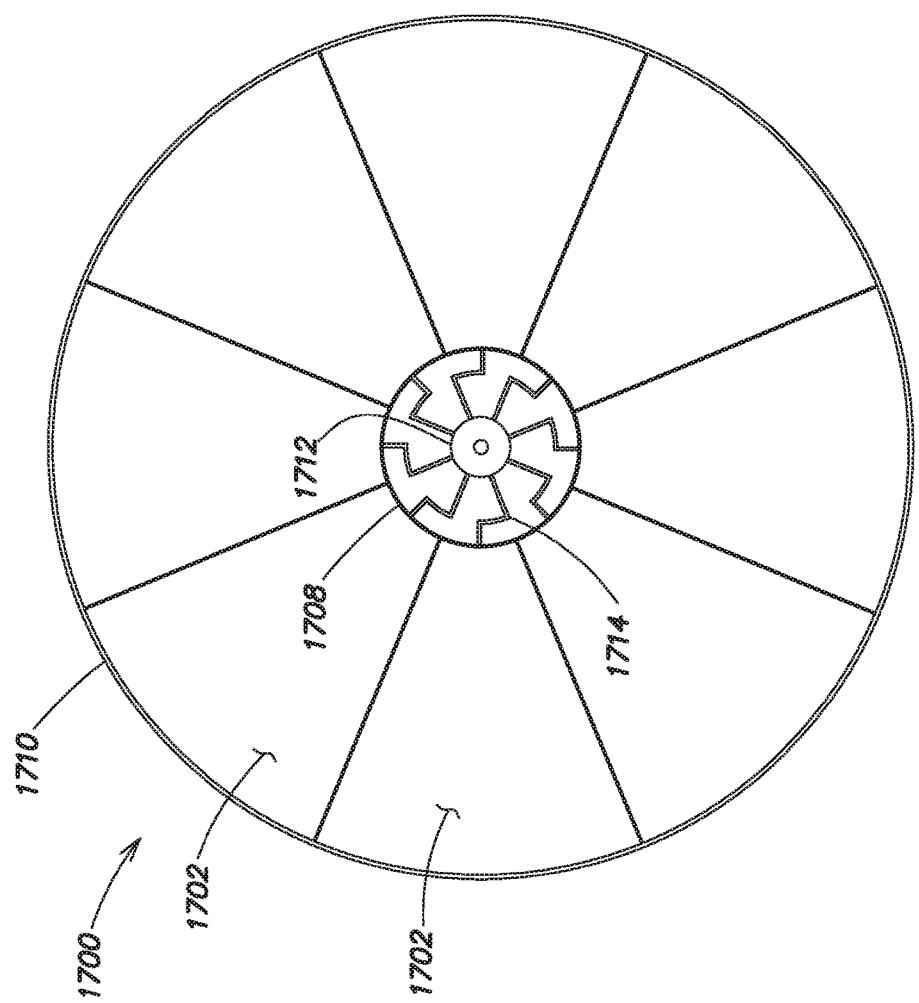

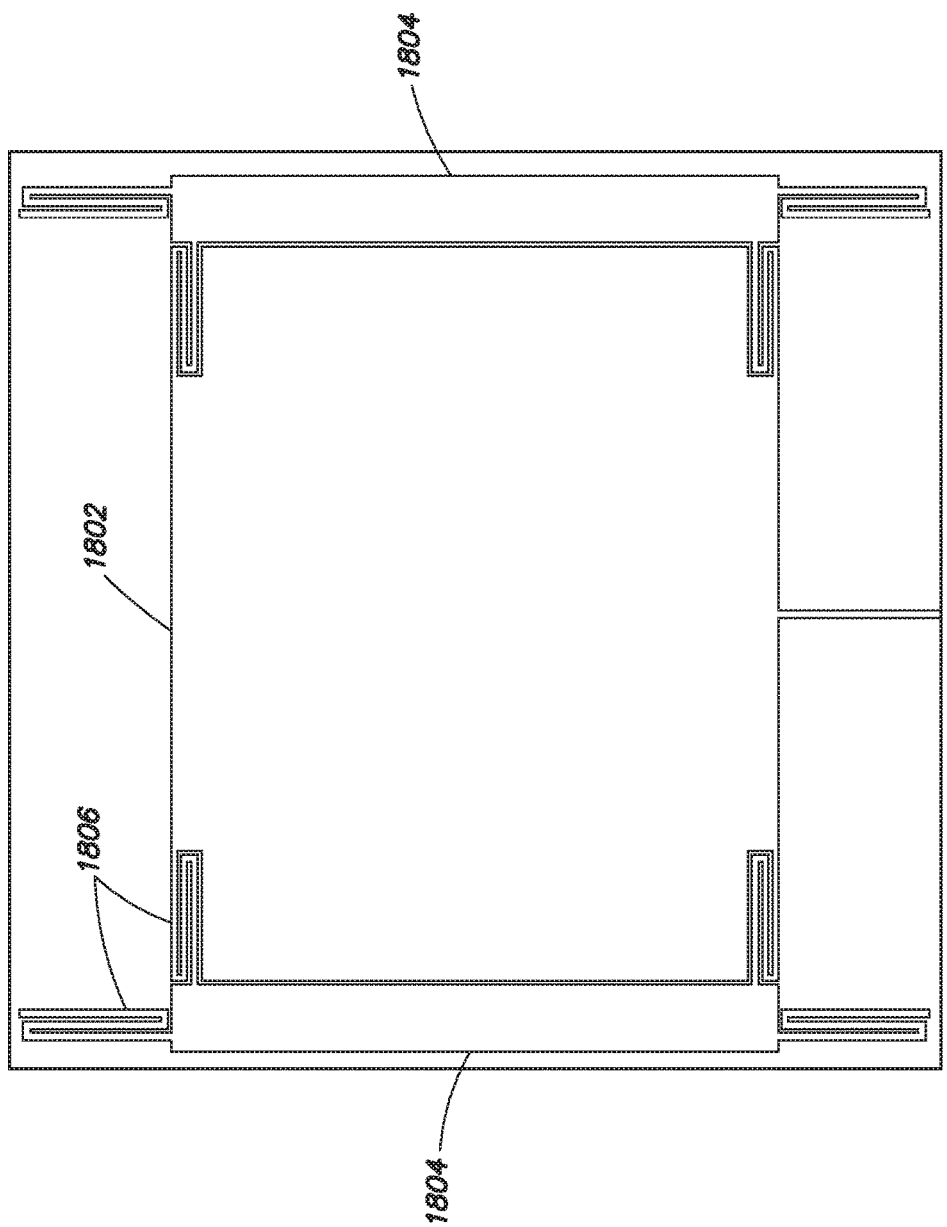

WHOLE ANGLE MEMS GYROSCOPE ON HEXAGONAL CRYSTAL SUBSTRATE

CROSS-REFERENCE TO RELATED APPLICATIONS

The presented application claims priority under 35 U.S.C. § 119(e) to U.S. Provisional Application Ser. No. 62/302,474, filed on Mar. 2, 2016 entitled WHOLE ANGLE MEMS GYROSCOPE and U.S. Provisional Application Ser. No. 62/165,365, filed on May 22, 2015, entitled WHOLE ANGLE MEMS GYROSCOPE, both of which are hereby incorporated herein by reference.

GOVERNMENT LICENSE RIGHTS

This invention was made with government support under N66001-16-C-4020 awarded by SPAWAR SYSTEMS CENTER PACIFIC on behalf of DARPA. The government has certain rights in the invention.

BACKGROUND OF THE INVENTION

The present disclosure generally relates to vibrating structure gyroscopes and more specifically to Microelectromechanical System (MEMS) based vibrating structure gyroscopes. Vibrating structure gyroscopes utilize solid-state resonators, of different shapes, to measure orientation or rotation rate based on the principle that a vibrating object tends to continue vibrating (i.e., oscillate) in a fixed orientation in space as its support rotates, and any vibrational deviation of the object can be used to derive a change in direction. Vibrating structure gyroscopes may be manufactured with MEMS based technology. For example, vibrating structure gyroscopes may be fabricated on silicon or glass wafers using a sequence of steps including photolithography, etching and deposition, or any other MEMS based technology.

Vibrational deviations in a resonator of a MEMS based gyroscope may be caused by a Coriolis force. For example, a mass moving at a given velocity will experience Coriolis acceleration when the mass is also rotated with an angular velocity. The Coriolis acceleration is perpendicular to the velocity and the angular velocity. The Coriolis acceleration vector is given by $a_c = -2(v \times \Omega)$, where v is the velocity vector and $\Omega$ is the angular velocity vector. Coriolis acceleration is thus indicative of the angular velocity of rotation.

Many MEMS based gyroscopes are configured to operate in a rate mode. In a rate mode of operation, vibration of one axis (i.e., a drive axis) of a MEMS based gyroscope is driven at a fixed amplitude in a closed loop while Coriolis-induced motion is read out on the other axis (i.e., a sense axis). In such a rate mode, the amplitude of the Coriolis-induced motion read out on the sense axis is indicative of a rate of angular movement of the gyroscope. Rate mode operated gyroscopes are limited in that the Coriolis-induced motion measurements are limited by the dynamic range of the open-loop sense axis. For fast movements of the gyroscope, the open-loop sense axis may not be able to ""keep up"" with the movement of the gyroscope. In addition, spring non-linearities at high rates of rotation may cause errors. Some MEMS based gyroscopes operated in rate mode attempt to avoid these problems by also operating the sense axis in a closed loop and monitoring the level of force required to maintain the amplitude of the sense axis at a fixed level. However, such gyroscopes are limited by the closed sense loop bandwidth and the maximum force capable of being exerted by the rebalance.

One example of a MEMS based gyroscope configured to operate in a rate mode is a Tuning Fork (TF) gyroscope. A Tuning Fork gyroscope includes a pair of relatively large lumped-element proof masses that are driven to oscillate, in an in-plane axis, with equal amplitude but in opposite directions. When a TF gyroscope is rotated, the Coriolis force creates an orthogonal vibration (i.e., an out-of-plane vibration) in the proof masses that can be sensed by a variety of mechanisms. By monitoring out-of-plane vibrations of the proof masses, the rate of rotation of the TF gyroscope can be determined.

Another mode of operation for MEMS based gyroscopes is a whole angle mode (otherwise known as an integrating or rate integrating mode). In a whole angle mode of operation, two axes, having identical frequency and damping, are coupled by Coriolis motion. The axes are driven such that the total vibrational amplitude of the two axes is sustained, but the distribution of energy between the two axes is allowed to change freely. Accordingly, a Coriolis force causes energy to be transferred from one axis to the other as the gyroscope rotates. By measuring the distribution of energy between the axes, an angle of rotation (with respect to a starting angle) can be read out. As energy can freely transfer from one axis to the other in a MEMS based gyroscope operating in whole angle mode, there is no limit on the rate at which the axes can transfer motion. As such, whole angle operating gyroscopes avoid the dynamic range issues discussed above with regard to rate mode operating gyroscopes and typically provide a higher level of performance and higher bias stability.

One important requirement of a whole angle operating MEMS based gyroscope is that the two modes be identical (i.e., degenerate) with regard to frequency and damping. If the frequencies differ substantially, a Coriolis force caused by rotation of the gyroscope will not be sufficient to transfer energy from one mode to the other and the vibration will stay ""locked"" to a single axis. This will interfere with the free transfer of motion between modes and the free precession of the mode shape of the gyroscope. A whole angle operating MEMS based gyroscopes must therefore be designed and fabricated with exceptional symmetry and with mode structures that are insensitive to expected fabrication variations. In addition, it is also typically desired for whole angle operating MEMS based gyroscopes to provide low damping (i.e., long ring down time) and matched damping for principle axes. This is because low overall damping correlates to low damping differences between the two axes and on-axis damping may result in gyroscope bias when drive forcers are misaligned. A mismatch (or mismatch drift) may result in a bias (or bias drift).

Traditional whole angle MEMS based gyroscopes include an axially or cylindrically symmetric and continuous structure that is driven to excite two vibratory modes of the structure (i.e., an n=2 vibratory mode where two points of the ring are moving away from the center of the ring while two other points of the ring are moving toward the center of the ring). Rotation of the gyroscope results in a Coriolis force that causes movement (i.e., either inward or outward motion) of other points of the symmetric structure. By monitoring the movement of the symmetric structure in two in-plane axes, the angle of rotation of the gyroscope can be determined.

One common example of a whole angle operating gyroscope is a Hemispherical Resonator Gyroscope (HRG) (otherwise known as a wine-glass gyroscope). An HRG includes a thin hemispherical shell, anchored by a stem. The shell is driven to a flexural resonance and a gyroscopic effect is obtained from the inertial property of resulting flexural standing waves. An HRG is typically reliable and accurate; however, they are also typically large and costly.

Another example of a whole angle operating gyroscope is a ring gyroscope. Ring gyroscopes include axially symmetric and continuous rings that are driven in an n=2 vibratory mode, as discussed above. The movement of the ring is monitored to determine an angle of rotation of the ring gyroscope. The performance of such ring gyroscopes is limited in that due to the limited mass of the rings, the sensitivity of the gyroscope is relatively low and the bias instability is relatively high.

SUMMARY

A new MEMS based gyroscope design is provided that combines the best features of a lumped-element TF gyroscope and a rotationally symmetric gyroscope. Certain embodiments efficiently use relatively large masses (e.g., like a TF gyroscope) supported by relatively weak flexures to provide low damping and hence high sensitivity while maintaining an eight-fold symmetry conducive to the n=2 vibratory mode used in most whole angle based gyroscopes to provide high dynamic range. As discussed in more detail below, certain embodiments are capable of operating in both rate and whole angle mode, are low cost, and are easily fabricated.

One aspect of the present disclosure is directed to a gyroscope comprising an axially symmetric structure, and a plurality of transducers, each configured to perform at least one of driving and sensing motion of the axially symmetric structure, wherein the plurality of transducers is configured to drive the axially symmetric structure in at least a first vibratory mode and a second vibratory mode, and wherein the gyroscope is implemented on a hexagonal crystal-based substrate.

According to one embodiment, each transducer is located at a periphery of the axially symmetric structure. In one embodiment, at least one transducer is configured to electrostatically drive motion of the axially symmetric structure. In another embodiment, at least one transducer is configured to magnetically drive motion of the axially symmetric structure. In one embodiment, at least one transducer is configured to optically drive motion of the axially symmetric structure. In another embodiment, at least one transducer is configured to piezoelectrically drive motion of the axially symmetric structure. In one embodiment, at least one transducer is configured to thermally drive motion of the axially symmetric structure.

According to another embodiment, the plurality of transducers is further configured to drive the axially symmetric structure in an n=2 vibratory mode. In one embodiment, the first vibratory mode and the second vibratory mode are 45° apart. In another embodiment, the plurality of transducers is further configured to drive motion of the axially symmetric structure at a fixed amplitude in the first vibratory mode and to sense motion of the axially symmetric structure in the second vibratory mode. In one embodiment, the gyroscope further comprises a controller coupled to the plurality of transducers, wherein the plurality of transducers is further configured to provide signals to the controller based on the sensed motion of the axially symmetric structure in the second vibratory mode, and wherein the controller is configured to calculate a rate of rotation of the gyroscope based on the signals.

According to one embodiment, the plurality of transducers is further configured to drive motion of the axially symmetric structure such that a total vibrational energy is maintained across the first vibratory mode and the second vibratory mode and to sense a distribution of energy between the first vibratory mode and the second vibratory mode. In one embodiment, the gyroscope further comprises a controller coupled to the plurality of transducers, wherein the plurality of transducers is further configured to provide signals to the controller based on the sensed distribution of motion between the first vibratory mode and the second vibratory mode, and wherein the controller is configured to calculate an angle of rotation of the gyroscope based on the signals.

According to another embodiment, the axially symmetric structure comprises a central anchor, a plurality of internal flexures, a plurality of masses, each mass coupled to the central anchor via at least one of the plurality of internal flexures and configured to translate in a plane of the gyroscope, and a plurality of mass-to-mass couplers, each mass-to-mass coupler coupled between two adjacent masses of the plurality of masses, wherein the plurality of transducers is configured to drive the plurality of masses in at least the first vibratory mode and the second vibratory mode. In one embodiment, each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses. In one embodiment, the plurality of masses includes a plurality of wedge-shaped masses.

According to one embodiment, the gyroscope further comprises a plurality of outside anchors, a plurality of outside shuttles, each located at a periphery of a corresponding one of the plurality of masses, and a plurality of outside flexures, wherein each mass of the plurality of masses is suspended between the central anchor and the plurality of outside anchors via the plurality of internal flexures and the plurality of outside flexures, and wherein each one of the plurality of outside shuttles is configured to restrict rotation of its corresponding one of the plurality of masses. In one embodiment, each one of the plurality of outside shuttles is further configured to decouple x- and y-motion of its corresponding one of the plurality of masses. In another embodiment, each one of the plurality of outside shuttles is further configured to prevent force from being applied circumferentially to its corresponding one of the plurality of masses.

According to another embodiment, the gyroscope further comprises a plurality of internal shuttles, each one of the plurality of internal shuttles coupled between the central anchor and a corresponding one of the plurality of masses and configured to restrict rotation of its corresponding one of the plurality of masses. In one embodiment, each one of the plurality of internal shuttles is further configured to decouple x- and y-motion of its corresponding one of the plurality of masses.

According to one embodiment, the gyroscope further comprises a plurality of angled electrodes, each angled electrode coupled to a corresponding one of the plurality of masses and configured to trim the cross spring term of the corresponding one of the plurality of masses. In one embodiment, in trimming the cross spring term of its corresponding one of the plurality of masses, each angled electrode is configured to generate a radial force component in the second vibratory mode in response to a circumferential motion of its corresponding one of the plurality of masses in the first vibratory mode, and generate a circumferential force component in the second vibratory mode in response to a radial motion of its corresponding one of the plurality of masses in the first vibratory mode, wherein the radial force component and the circumferential force component are configured to either assist or oppose the vibration of the plurality of masses in the second vibratory mode to trim the cross spring term.

According to another embodiment, the hexagonal crystal-based substrate is a Silicon Carbide (SiC) based substrate. In one embodiment, the SiC based substrate is a 4H—SiC based substrate. In another embodiment, the hexagonal crystal-based substrate is oriented in the (0001) plane of a hexagonal crystal.

According to one embodiment, the gyroscope has a thickness, and wherein the plurality of internal flexures includes flexures having a width that is at least five times narrower than the thickness of the gyroscope. In one embodiment, the gyroscope is a Microelectromechanical System (MEMS) based gyroscope. In another embodiment, the axially symmetric structure is one of a ring and a disk.

Another aspect of the present disclosure is directed to a gyroscope comprising an axially symmetric structure, means for driving the axially symmetric structure in an n=2 vibratory mode of a rotationally symmetric gyroscope, and means for operating the gyroscope in one of a rate mode of operation and a whole angle mode of operation, wherein the gyroscope is implemented on a hexagonal crystal-based substrate.

According to one embodiment, the gyroscope further comprises means for decoupling radial and circumferential motion of each one of the plurality of masses. In another embodiment, the gyroscope further comprises means for trimming a cross spring term of the gyroscope.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 6C is a diagram illustrating further detail of the MEMS based gyroscope shown in FIG. 6B according to aspects of the present invention;

FIG. 6E is a diagram illustrating further detail of the MEMS based gyroscope shown in FIG. 6D according to aspects of the present invention;

FIG. 6F is a diagram of another embodiment of a MEMS based gyroscope according to aspects of the present invention;

FIG. 8 is a diagram of another embodiment of a MEMS based gyroscope according to aspects of the present invention;

FIG. 17A is a diagram of another embodiment of a MEMS based gyroscope according to aspects of the present invention;

FIG. 19 is a diagram illustrating further detail of the MEMS based gyroscope shown in FIG. 18 according to aspects of the present invention.

DETAILED DESCRIPTION

Aspects and embodiments described herein provide a MEMS based gyroscope design that combines the best features of a TF gyroscope and a rotationally symmetric gyroscope. Certain embodiments efficiently use relatively large masses (e.g., similar to a TF gyroscope) to provide high sensitivity while maintaining an eight-fold symmetry conducive to the n=2 vibratory mode used in most whole angle based gyroscopes to provide high dynamic range. Certain embodiments are capable of operating in both rate and whole angle mode, may be low cost, and may be easily fabricated.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
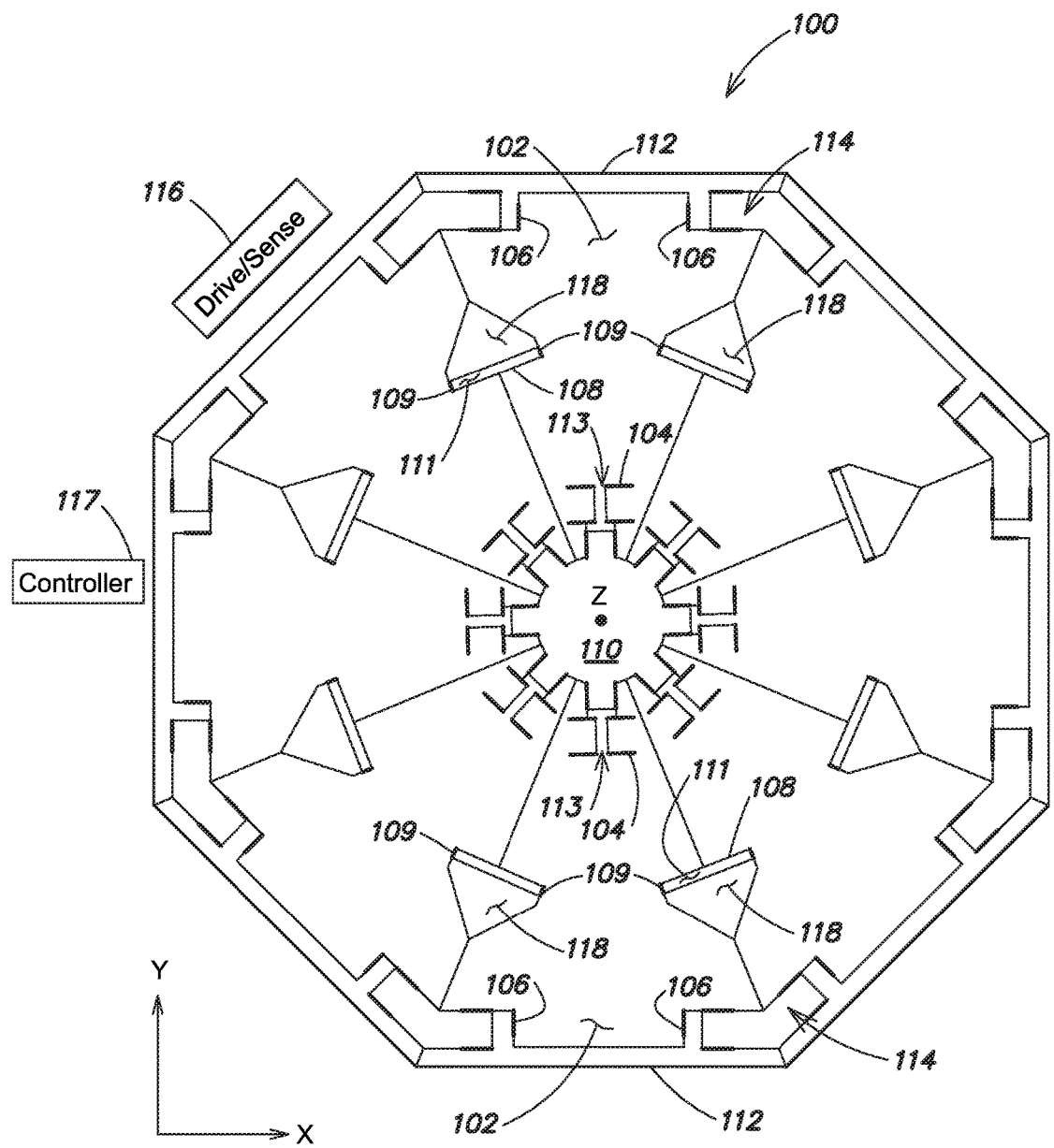
FIG. 1 is a diagram illustrating one embodiment of a MEMS based gyroscope according to aspects of the present invention.

Referring to FIG. 1, there is illustrated one embodiment of a MEMS based gyroscope 100 configured according to aspects of the present disclosure. The gyroscope 100 includes eight wedge-shaped masses 102, internal flexures 104, outer flexures 106, a central anchor 110, outer anchors 114, outer shuttles 112, inner shuttles 113, and mass-to-mass couplers 108.

Figure 2:
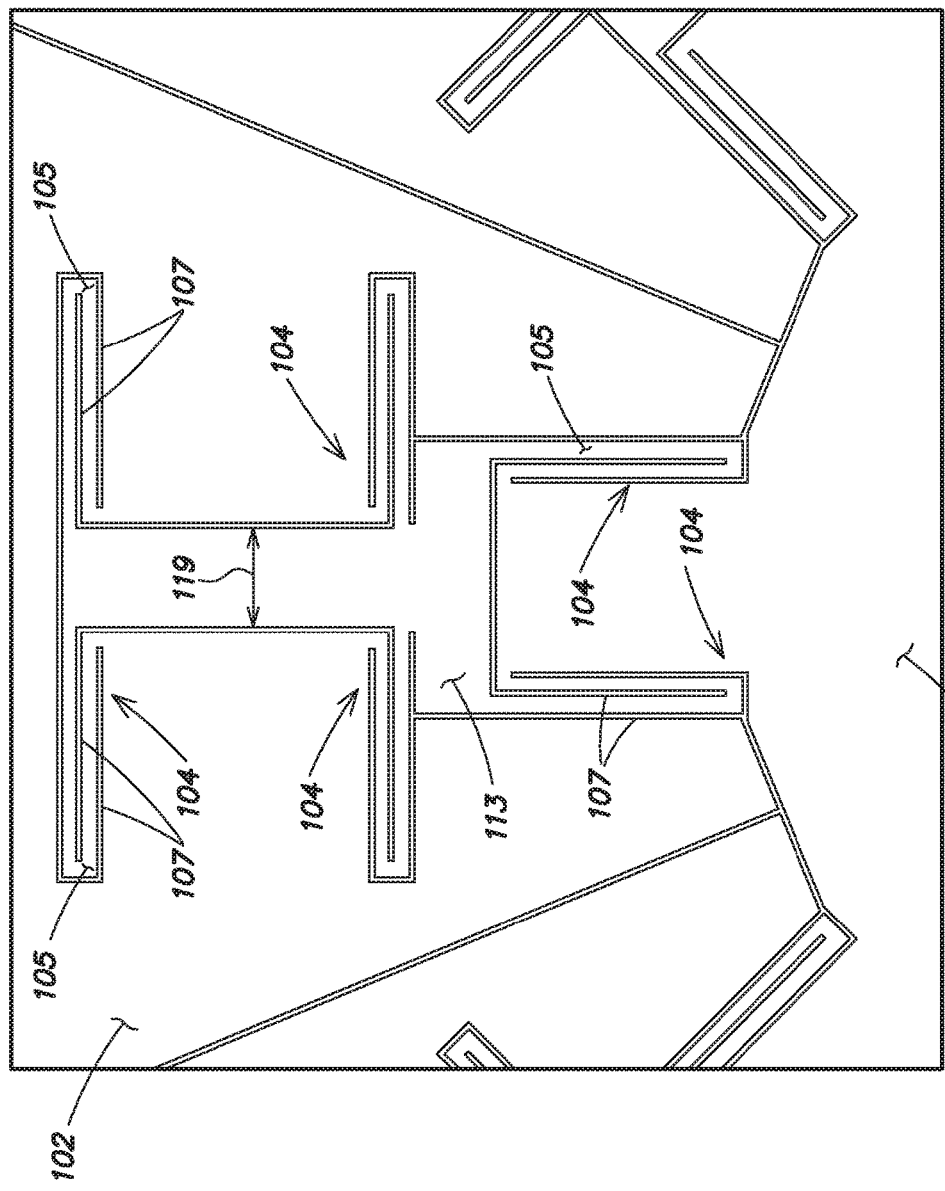
FIG. 2 is a diagram of an internal flexure according to aspects of the present invention.
Figure 3:
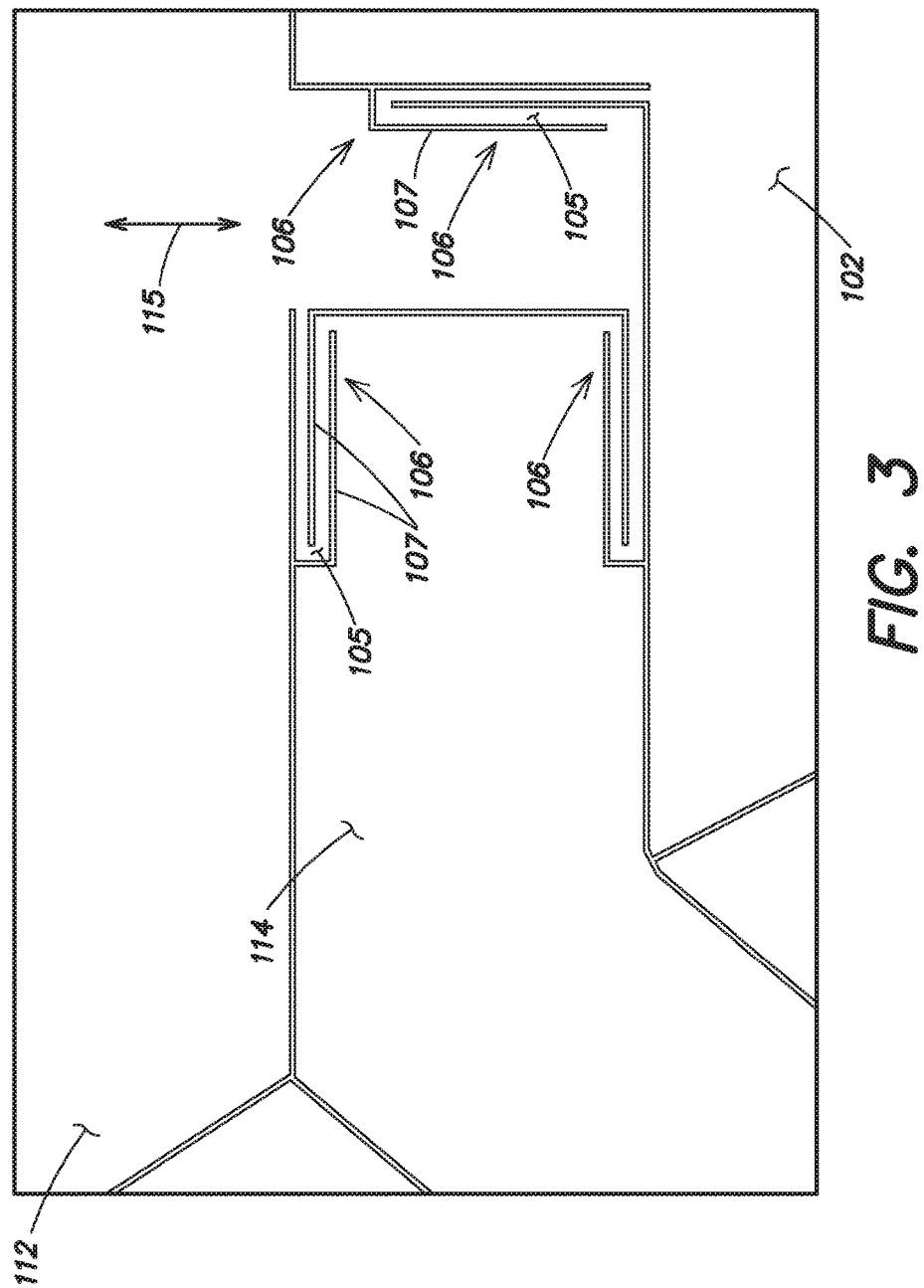
FIG. 3 is a diagram of an outer flexure according to aspects of the present invention.

Each mass 102 is suspended between an inner shuttle 113 and an outer shuttle 112 via internal flexures 104 and outer flexures 106 and is configured to translate in the plane of the gyroscope 100 on the flexures 104, 106. An internal flexure 104 is shown in greater detail in FIG. 2 and an outer flexure 106 is shown in greater detail in FIG. 3. According to one embodiment (shown in FIGS. 2 and 3) where the gyroscope 100 is fabricated on a silicon wafer, the internal flexures 104 and outer flexures 106 include areas of silicon 105 defined by slots 107 (i.e., areas of empty space) in the silicon that are configured to allow a coupled mass 102 to vibrate (i.e., translate) in the plane of the gyroscope 100. In other embodiments, the flexures 104, 106 may be constructed differently. The central anchor 110 and the outer anchors 114 are configured to support the structure. The mass-to-mass couplers 108 are coupled between adjacent masses 102.

Each internal shuttle 113 and outer shuttle 112 is configured to enforce radial forcing on its corresponding mass 102 and restrict rotation of its corresponding mass 102 by decoupling x- (i.e., radial) and y- (i.e., circumferential) motion. For example, each outer shuttle 112 is configured to only move radially (i.e., in a direction 115 in towards the anchor or out away from the anchor 110) and each inner shuttle 113 is configured to move only circumferentially (i.e., in direction 119) around the anchor 110. Accordingly, each mass 102 may only translate in the plane of the gyroscope 100 (i.e. move radially and/or circumferentially in the plane of the gyroscope 100). By decoupling the x- and y-motion, the stiffness of each direction may be designed independently. Also, out-of-plane motion may be suppressed by utilizing flexures of high aspect ratio (i.e. whose width is at least five times narrower than the thickness of the flexure for the whole planar gyroscope 100). For example, a gyroscope that is 100 microns in thickness may utilize flexures which are five times narrower (e.g., 20 microns wide), ten times narrower (e.g., 10 microns wide), or twenty times narrower (5 microns wide). In addition, each outer shuttle 112 may also reduce errors caused by misaligned drive/sense transducer 116 electrodes by being stiff in the direction of the misaligned force component (i.e., by only moving radially in and out, the outer shuttle 112 reduces any erroneous circumferential forces on the mass 102 from the drive).

The gyroscope 100 also includes drive/sense transducers 116. For the ease of illustration, only one drive/sense transducer 116 is shown in FIG. 1; however, a drive/sense transducer 116 is located at the periphery of each mass 102 in the gyroscope 100. Each drive/sense transducer 116 is capable of driving motion of its corresponding mass 102 and of sensing motion of its corresponding mass 102. For example, in at least one embodiment, each drive/sense transducer 116 is an electrostatic transducer (e.g., a variable capacitor) that includes an electrode positioned at the periphery of a corresponding mass 102 and an electrode positioned on a corresponding outer shuttle 112. When a voltage is applied to the electrode at the periphery of the mass 102, motion of the mass is electrostatically driven. Each drive/sense transducer 116 is also configured to sense motion of its corresponding mass and provide a signal indicative of the motion to an external controller/processor 117. According to one embodiment, the drive/sense transducers 116 are clapper or comb drives; however, in other embodiments, any other appropriate type of circuit capable of driving and sensing motion of a mass 102 may be utilized. For example, in other embodiments, magnetic, piezoelectric, thermal, or optical based transducers may be utilized.

As discussed above, the drive-sense transducers 116 are located at the periphery of each mass 102; however, in other embodiments, a transducer 116 may be located at any other position adjacent a mass 102. In addition, according to at least one embodiment, each drive-sense transducer 116 is located internal to a mass 102.

As also discussed above, a single transducer 116 is associated with each mass 102; however, in other embodiments, each mass 102 may be associated with more than one transducer 116. For example, in at least one embodiment, each mass 102 is associated with a first transducer that drives motion of the mass 102 and a second transducer that senses motion of the mass 102. In another embodiment, each mass 102 also includes a third transducer that is utilized for tuning the mass 102 (e.g., tuning the radial spring constant of the mass 102). In other embodiments, the transducer(s) 116 associated with each mass 102 may be configured in any appropriate way to drive motion of the mass 102, sense motion of the mass 102, and/or tune the mass 102.

Figure 4:
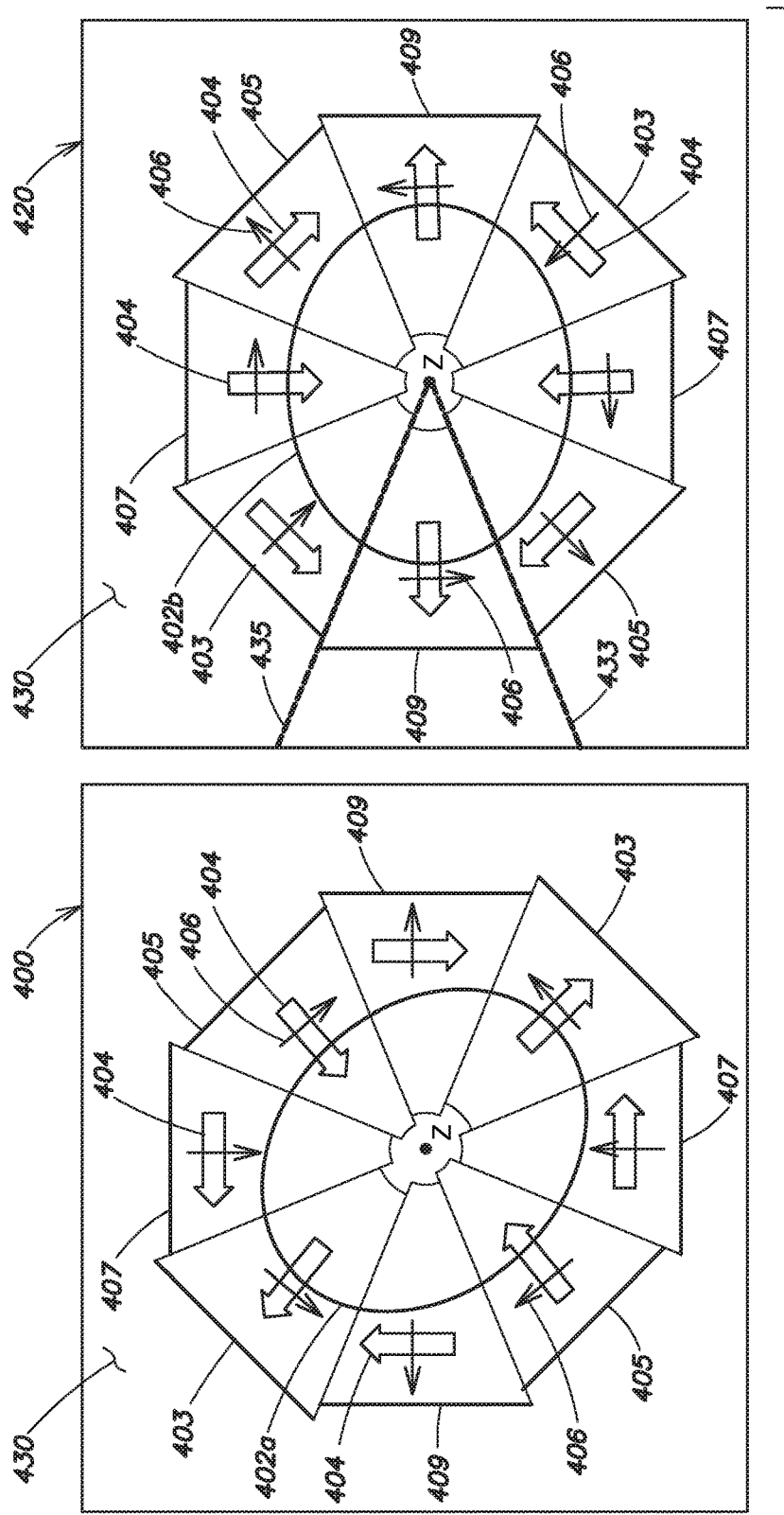
FIG. 4 is a diagram illustrating two degenerate vibratory modes of a MEMS based gyroscope according to aspects of the present invention.

As the masses 102 in the gyroscope 100 vibrate, the mass-to-mass couplers 108 couple the motion of the masses 102 together, resulting in an n=2 vibratory mode resembling that of a rotationally symmetric gyroscope (e.g., a ring, disc, or hemispherical gyroscope). FIG. 4 is a diagram illustrating two degenerate vibratory modes (a first vibratory mode 400 and a second vibratory mode 420) of the gyroscope 100. Considering the first vibratory mode 400, if the gyroscope 100 is not rotating, two of the masses 405 are translating inwardly and two of the masses 403 are translating outwardly. As shown in FIG. 4, the first n=2 vibratory mode shape 400 of the gyroscope is an ellipse 402a. Due to the mass-to-mass couplers 108, the other four masses 407, 409 are translating circumferentially. Resulting velocity vectors 404 are also shown for each mass. Considering the second vibratory mode 420, if the gyroscope 100 is not rotating, two of the masses 407 are translating inwardly and two of the masses 409 are translating outwardly. As shown in FIG. 4, the second n=2 vibratory mode shape 420 of the gyroscope is an ellipse 402b that is rotated 45° in relation to ellipse 402a of the first vibratory mode 400. Due to the mass-to-mass couplers 108, the other four masses 403, 405 are translating circumferentially. Resulting velocity vectors 404 are also shown for each mass.

As the gyroscope 100 is rotated (e.g., due to rotation of the system to which the gyroscope 100 is attached) about axis (Z) which is perpendicular to the plane of the gyroscope 100, the vibratory modes 400, 420 exhibit coupling via Coriolis forces. For example, as shown in FIG. 4, the Coriolis forces 406 ($F_c=-2m\Omega \times v$) in the first vibratory mode 400 arising from the velocity vectors 404 force two masses 407 inward and two masses 409 outward, thus exciting the other vibratory mode 420.

The Coriolis forces 406 of the first vibratory mode 400 remove energy from the first vibratory mode 400 and excite motion in the second vibratory mode 420. For example, as shown in FIG. 4, the Coriolis force 406 applied to each mass in the first vibratory mode 400 correspond to the displacement of the mass in the second vibratory mode 420. Therefore, the Coriolis forces 406 resulting from the rotation of the gyroscope 100 result in the transfer of energy from the first vibratory mode 400 to the second vibratory mode 420. Similarly, Coriolis forces of the second vibratory mode 420 reduce motion in the second vibratory mode 420 and excite motion in the first vibratory mode 400. Therefore, the Coriolis forces resulting from the rotation of the gyroscope 100 also result in the transfer of energy from the second vibratory mode 420 to the first vibratory mode 400.

More specifically, the vibratory motion in each mode 400, 420 is sinusoidal and as shown in the first vibratory mode 400 of FIG. 4, the masses 403 and 405 are at one extreme of their displacement (i.e., the outwardly moving masses 403 are at their largest radial distance and the inwardly moving masses 405 are at their smallest radial distance). At a time T/2=1/(2*f), where f is the frequency of the first vibratory mode 400 (T=1/f is the period and w=2πf is the frequency in radians per second), the masses 403 are closer to the center and the masses 405 are farther from the center. Accordingly, the position of each mass at any time is related to the phase of the oscillation at that time. In other words, if r403 is the radial position of masses 403 and r405 is the radial position of masses 405, then r403=r0*sin (wt) and r405=r0*sin (wt+π).

The velocity of each mass is out of phase with the displacement by π/2. Therefore, when a mass 403 is at the outward extreme (as shown in FIG. 4), its velocity is actually zero. The velocity vector 404 for each mass shown in FIG. 4 is actually the velocity at a time t=(π/2w)=1/(4*f)=(T/4) seconds ago. As such, the velocity of a mass 403 can be expressed as v403=v0*sin(wt+π/2)=r0w*cos (wt), and the velocity of a mass 405 can be expressed as v405=v0*sin (wt+3π/2)=r0w*cos (wt+π). These velocity equations show that in addition to the displacement vectors, the velocity vectors also reverse direction sinusoidally. For example, at each half cycle, the velocity vectors reverse direction. The corresponding Coriolis force vectors also reverse direction at each half cycle. This is necessary to excite motion in the other mode, as the other mode also has sinusoidal motion which requires sinusoidal forcing. In at least one embodiment, it is desired to set the frequency of the force sinusoid equal to the resonance frequency of the mode being excited. By setting these frequencies equal, stronger coupling of the modes may be achieved.

With reference to the first vibratory mode 400 of FIG. 4, the positions of each mass 403, 405, 407, 409 are shown when the masses 403 and 405 are at one extreme of their displacement and the velocity 404 and Coriolis vectors 406 are shown at a time T/4 seconds earlier. The time at which the Coriolis force vectors 406 are shown in the first vibratory mode 400 is the same time at which the velocity vectors 404 are shown in the second vibratory mode 420 (the force is in phase with the velocity of the vibratory motion which is increasing, i.e., the force counteracts damping, which is proportional to velocity), which is again T/4 seconds earlier than the time corresponding to the position of the masses 403, 405, 407, 409 in the second vibratory mode 420. In other words the velocity vectors 404 and force vector 406 shown in each vibratory mode 400, 420 are shown at the same time.

As the Coriolis forces 406 in the first vibratory mode 400 excite the masses in the second vibratory mode 420 (i.e., assist the velocity vectors 404 in the second vibratory mode 420), the Coriolis forces 406 in the second vibratory mode 420 reduce the motion in the first vibratory mode 400 (i.e., are opposed to the velocity vectors 404 in the first vibratory mode 400). As such, energy is transferred from the first vibratory mode 400 to the second vibratory mode 420. At some point, all of the energy will have transferred and the motion in the first vibratory mode 400 will be zero.

At this point, the Coriolis forces 406 in the second vibratory mode 420 remain the same, but are now working with zero velocity in the first vibratory mode 400. The Coriolis forces 406 excite the motion shown in the first vibratory mode 400, but with a phase difference of π. Accordingly, the time at which the velocity vectors 404 are as shown in the first vibratory mode 400 of FIG. 4 is T/2 different than as previously discussed. This means that the Coriolis force vectors 406 in the first vibratory mode 400 also reverse direction, thus reducing motion in the second vibratory mode 420. As such, energy is transferred back to the first vibratory mode 400 from the second vibratory mode 400. It is to be appreciated that one complete cycle of energy transfer (i.e., the first vibratory mode 400 to the second vibratory mode 420 and back to the first vibratory mode 400) results in a phase shift of π in the vibratory oscillation. The next half cycle (i.e., the first vibratory mode 400 to the second vibratory mode 420) will likewise result in motion in the second vibratory mode 420 that is π different than before.

The transfer of energy between modes can also appear similar to a rotation of the modal shape (i.e., the second vibratory mode 420 appears as a 45° rotated version of the first vibratory mode 400). It is to be appreciated that, from a frame of reference affixed to the gyroscope 100, the gyroscope structure 100 does not rotate; rather, the orientation of the overall vibratory mode (superposition of modes 400 and 420 in varying proportions) appears to rotate in that frame as that frame of reference is rotated. At overall vibratory mode orientations between 45°, some combination of the two modes 400 and 420 will appear, i.e. all masses will be moving both radially and circumferentially, in proportion to the angular distance between the current orientation and the starting orientation. For rate mode operation, the control commands exert rebalancing forces to null (maintain at zero) the radial motion of either masses 407, 409 or masses 403, 405. For whole angle mode operation, the exchange of energy (or apparent rotation of the overall vibratory mode) is allowed to occur without interference. Because of damping, forces must be continually applied along the direction of largest motion (or the direction of the overall vibratory mode), which is accomplished by applying the appropriate proportion of force (determined by the vector components of the orientation) via both the transducers 116 located at the masses 407, 409 and the masses 403, 405.

By monitoring the motion of the masses 102 in the gyroscope 100 the rotation of the gyroscope 100 can be determined. For example, in a rate mode of operation of the gyroscope 100, one of the modes (e.g., the first vibratory mode 400 or the second vibratory mode 420) is continually driven at a fixed amplitude by the drive/sense transducers 116, and the motion of the other mode is monitored, by the drive/sense transducers 116. Signals from the drive/sense transducers 116 based on the sensed motion are provided to the controller 117 (coupled to the drive/sense transducers 116) and the controller 117 can determine a rate of rotation of the gyroscope 100 based on the signals. For example, in one embodiment, the motion of masses 102 in one mode (e.g., the first vibratory mode 400 or the second vibratory mode 420) is driven at a fixed amplitude (by the drive/sense transducers 116) while the other mode is measured (by the drive/sense transducers 116) in an open loop. In such an embodiment, the amplitude of motion sensed by the drive/sense transducers 116 is proportional to the rate of rotation of the gyroscope. In another embodiment, the motion of masses 102 in one mode (e.g., the first vibratory mode 400 or the second vibratory mode 420) is driven at a fixed amplitude (by the drive/sense transducers 116) while the motion of masses 102 in the other mode is fixed at zero, by the drive/sense transducers 116, in a closed-loop. The required feedback force necessary to maintain the motion of the masses 102 at zero is proportional to the rate of rotation of the gyroscope 100.

In a whole-angle mode of operation, the motion of masses 102 in both modes 400, 420 is driven by the drive/sense transducers 116 such that the total vibrational amplitude of the masses 102 across both modes 400, 420 is sustained, but the distribution of energy between the two modes 400, 420 is allowed to change freely. By measuring the distribution of motion between the modes 400, 420 with the drive/sense transducers 116 and providing signals based on the distribution of motion to the controller 117, an angle of rotation (with respect to a starting angle) can be read out by the controller 117. According to one embodiment, the control scheme discussed in U.S. Pat. No. 7,318,347, titled "HEMISPHERICAL RESONATOR GYRO CONTROL", filed on May 9, 2005, which is herein incorporated by reference in its entirety, is utilized to maintain the total vibrational amplitude constant across the modes 400, 420 while allowing the distribution of energy to transition freely between the modes 400, 420 subject to Coriolis forces.

The arrangement of the masses and flexures in the MEMS based gyroscope discussed above result in a gyroscope that combines the best features of a lumped element TF gyroscope and a rotationally symmetric gyroscope. The use of relatively large masses on relatively weak flexures enables low damping, high momentum, and high sensitivity which may result in low Brownian motion noise (the dominant resolution limit in MEMS based symmetric angular rate gyroscopes). The symmetrical eight mass configuration enables the gyroscope to behave like a continuous rotationally symmetric vibratory gyroscope (e.g., such as a hemisphere, ring, or disc gyroscope). The mass-to-mass couplers cause the eight masses to move in the n=2 vibratory mode, which is characterized by two opposite masses 403 moving out (i.e., away from center), the two opposite masses 405 (90° from the masses moving out) moving in (i.e., in towards the center), and the other four masses 407, 409 moving circumferentially. This vibratory mode emulates the vibratory mode of a rotationally symmetric gyroscope and is necessary so that the Coriolis forces, due to rotation about the Z axis, couple the two modes together, allowing the rate of rotation or the angle of rotation to be sensed based on the vibrations of the masses.

Figure 5A:
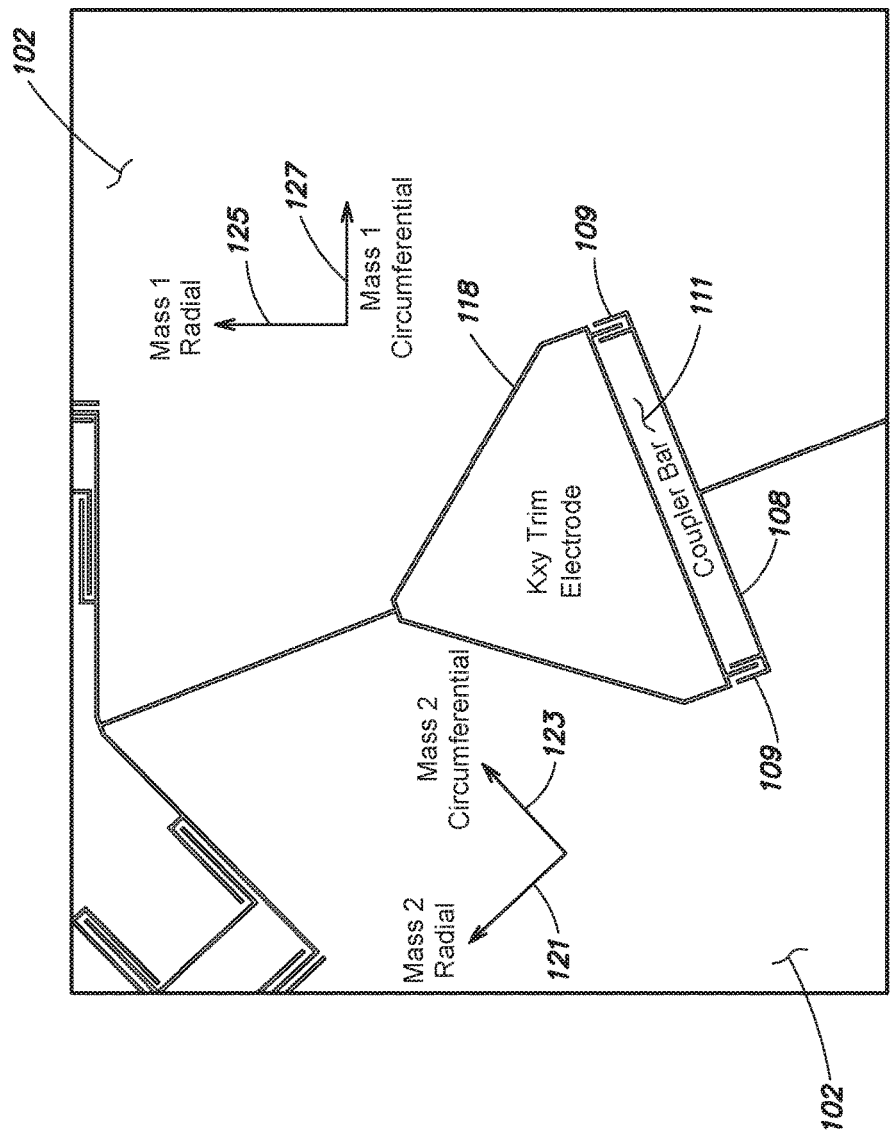
FIG. 5A is a diagram illustrating one embodiment of a $K_{xy}$ trim electrode and a mass-to-mass coupler according to aspects of the present invention.

The particular arrangement of the link between adjacent masses (i.e., the mass-to-mass couplers 108 shown in FIG. 1) is important to ensuring the correct modal structure of the gyroscope. For example, Applicant has appreciated that in order to couple the two modes together, each mass-to-mass coupler 108 must be stiff in the circumferential direction, yet compliant in the radial direction. For example, FIG. 5A is a diagram of one embodiment of a mass-to-mass coupler according to aspects of the present invention. The mass-to-mass coupler 108 includes a stiff "bar" 111 that has a flexural hinge 109 on either side. The stiff "bar" 111 operates such that the circumferential motion of a mass 102 to which it is coupled depends on the radial motion of the masses adjacent partner. Accordingly, as the masses 102 vibrate, the stiff "bar" 111 results in the gyroscope 100 operating in the n=2 vibratory mode. In other embodiments, any other type of mass-to-mass coupler can be used that couples masses together such that the radial and circumferential motions of adjacent masses 102 act in such a way as to result in the n=2 vibratory mode where two opposite masses 102 are moving radially outward, two opposite masses 102 are moving radially inward, and the masses 102 located in between move circumferentially. For example, according to some embodiments, the structure of the mass-to-mass coupler may be configured differently (e.g., as discussed below with regard to FIG. 10), the gyroscope may include multiple mass-to-mass couplers coupled between each adjacent mass (e.g., as discussed below with regard to FIG. 12), and in addition to being coupled between adjacent masses, the mass-to-mass coupler may also be coupled to a central anchor via a flexural hinge (e.g., as discussed below with regard to FIG. 16). According to some other embodiments, a mass-to-mass coupler includes a ring (or rings) that are configured to couple all masses together (e.g., as discussed below with regard to FIGS. 17-19).

According to at least one embodiment, the gyroscope 100 also includes angled electrodes 118 which enable the cross-spring term of the masses 102 to be trimmed. The cross spring term in the gyroscopes 100 equations of motion describes the mechanical coupling between modes 400, 420. More specifically, the cross spring term is a spring constant quantifying the amount of force applied in a direction that increases one mode proportionally in response to the motion of the other mode. It is advantageous to reduce or eliminate this term as it is desirable to have each mode only be excited by rotation of the gyroscope 100. Typically, this coupling is intentionally minimized by the design of the suspension (i.e., the springs or flexures). However, fabrication imperfections may cause the cross spring term to be non-zero. In a rate mode of operation, this may result in a quadrature error when the demodulation phase is also imperfect. As a result, standard TF gyroscopes typically tune out the cross-spring term by compensating it with a variable bias applied to the driver transducers (e.g., the drive combs).

In a whole-angle operating gyroscope, the cross-spring term may also lead to errors. For example, the performance of a whole angle operating gyroscope depends on the frequencies of two vibratory modes being equal. Reducing the frequency split between modes to zero is not possible unless the cross spring term is also reduced to zero. Some existing whole-angle-capable gyroscopes (e.g., such as a quad mass gyroscope) provide a capability of tuning only the on-axis spring term, and hence cannot achieve perfect mode matching. Such gyroscopes rely on the mechanical cross-spring term being small by design. Other vibratory MEMS based gyroscopes (e.g., such as ring gyroscopes) use electrostatic forcers located at specific locations to provide a tunable spring force that compensates for the mechanical cross spring term. None of the rate or whole angle based methods of compensating for the cross spring term are applicable to the gyroscope 100 discussed above. Accordingly, the gyroscope 100 includes the angled electrodes 118 which are configured to trim the cross-spring term of the masses 102.

Each angled electrode 118 is configured such that the electrode generates a radial force component in response to circumferential motion of a corresponding mass 102 and the electrode generates a circumferential force component in response to radial motion of the corresponding mass 102. For example, as shown in FIG. 5A, in response to circumferential motion 127 of a mass 102 (Mass 1), the electrode 118 applies a radial force component 125 to the same mass 102 (Mass 1) and in response to radial motion 125 of the mass 102 (Mass 1), the electrode 118 applies a circumferential force component 127 to the same mass 102 (Mass 1). Similarly, in response to circumferential motion 123 of the mass 102 (Mass 2), the electrode 118 applies a radial force component 121 to the same mass 102 (Mass 2) and in response to radial motion 121 of the mass 102 (Mass 2), the electrode 118 applies a circumferential force component 123 to the same mass 102 (Mass 2).

The magnitude of the circumferential and radial force components applied by an electrode 118 depends on the voltage applied to the electrode 118. Each electrode 118 is angled such that circumferential or radial motion in one vibratory mode (e.g., vibratory mode 400 or 420) results in a corresponding circumferential or radial force in the other mode. The resulting force, due to circumferential or radial motion, will either assist or oppose motion in the vibratory mode depending on which electrodes 118 are used and the voltages applied to them. Therefore, the cross spring term can be cancelled regardless of the polarity of the cross spring term.

Figure 5B:
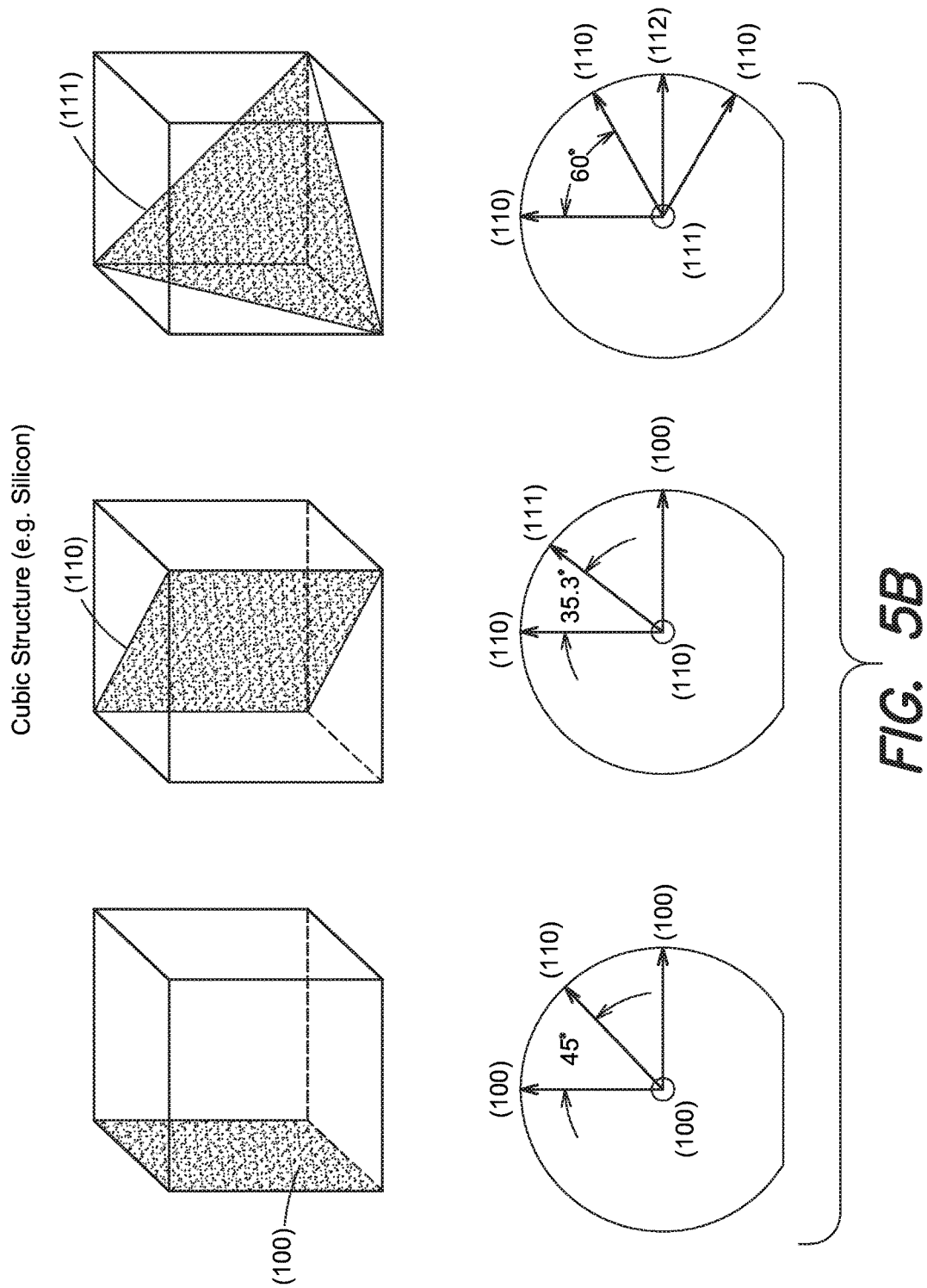
FIG. 5B is a diagram illustrating directional planes of a cubic crystal structure according to aspects of the present invention.

According to one embodiment, the MEMS based gyroscope 100 is implemented on a substrate (e.g., substrate 430 shown in FIG. 4). In at least one embodiment, the substrate 430 is a cubic crystal structure. As illustrated in FIG. 5B, a cubic crystal structure (e.g., single crystal silicon (Si)) exhibits anisotropic elastic properties such that flexures oriented along the (100) direction plane behave differently from flexures having the same geometry but oriented along the (110) direction plane (the (100) direction plane and the (110) direction plane being 45° apart). This causes errors in whole angle operation because the natural frequencies of the two vibratory modes will differ.

Figure 5C:
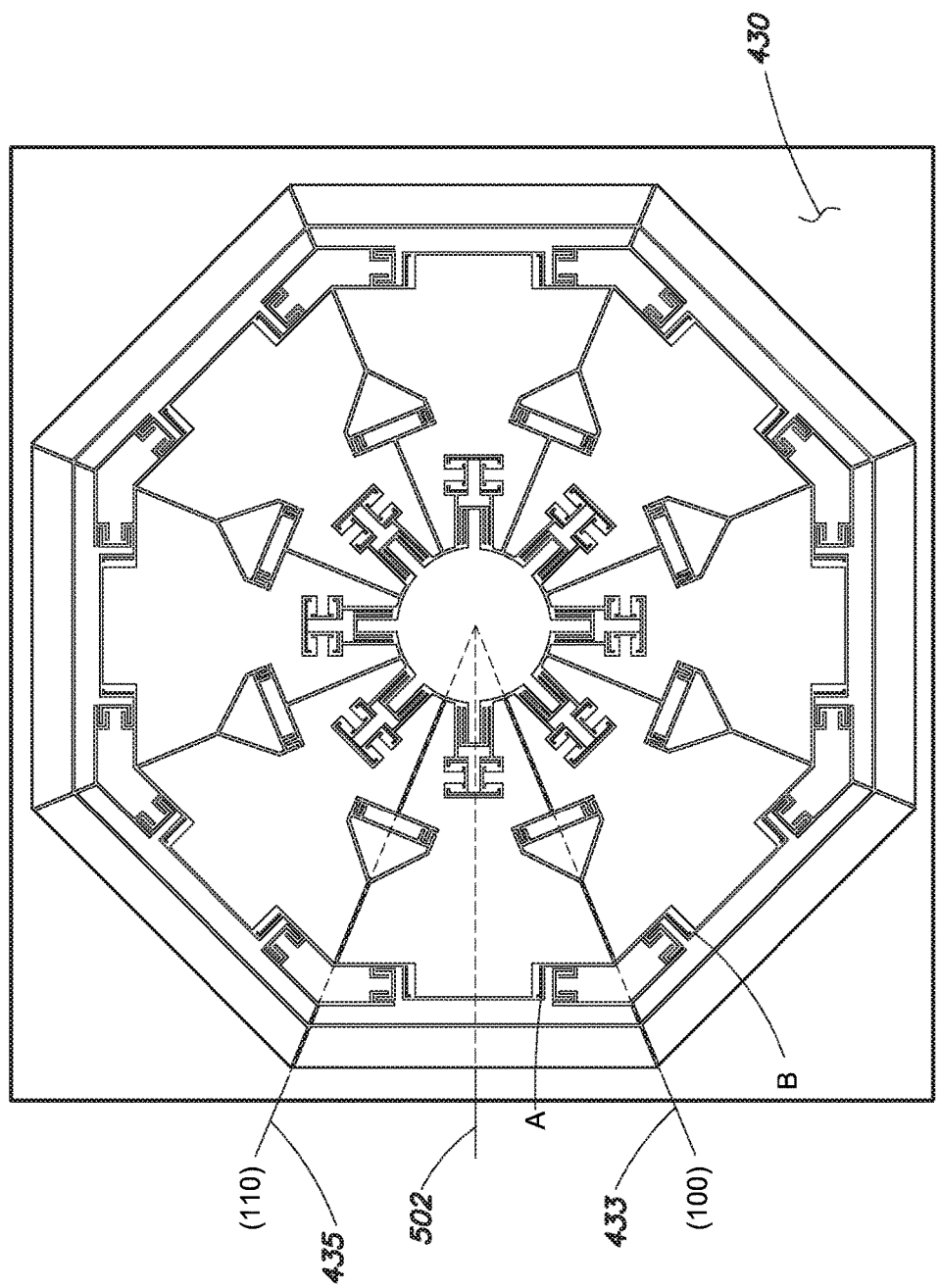
FIG. 5C is a diagram illustrating one embodiment of the orientation of a MEMS based gyroscope relative to the crystallographic orientation of a cubic crystal structure according to aspects of the present invention.

Historically the difference in moduli between the (100) direction and the (110) direction has been compensated for by adjusting flexure width; however, in at least one embodiment, these modulus differences are compensated for by rotating the entire device by 22.5° relative to the (100) direction plane. For example, as shown in FIG. 5C, when constructing the device, the geometry of the device is oriented relative to the crystallographic orientation of silicon such that the (100) plane falls along direction 433 and the (110) plane falls along direction 435. This places the axis of the corresponding flexures (e.g., flexures A and B) along a line 502 that is halfway between the (100) direction plane 433 and the (110) direction plane 435 (i.e., 22.5° between the (100) and (110) direction planes), rather than exactly on either the (100) direction plane 433 or the (110) direction plane 435. The result is that all flexures having the same geometry have the same modulus, and will thus behave in the same way. This may save design time and also reduce errors that arise from imperfect width-based compensation, which is often attempted using simplified analytical models that imperfectly predict the stiffness of complicated flexures. As discussed above, the MEMS based gyroscope 100 is implemented on a silicon based substrate; however, in other embodiments, the MEMS based gyroscope 100 can be implemented on any type of cubic crystal structure.

Figure 5D:
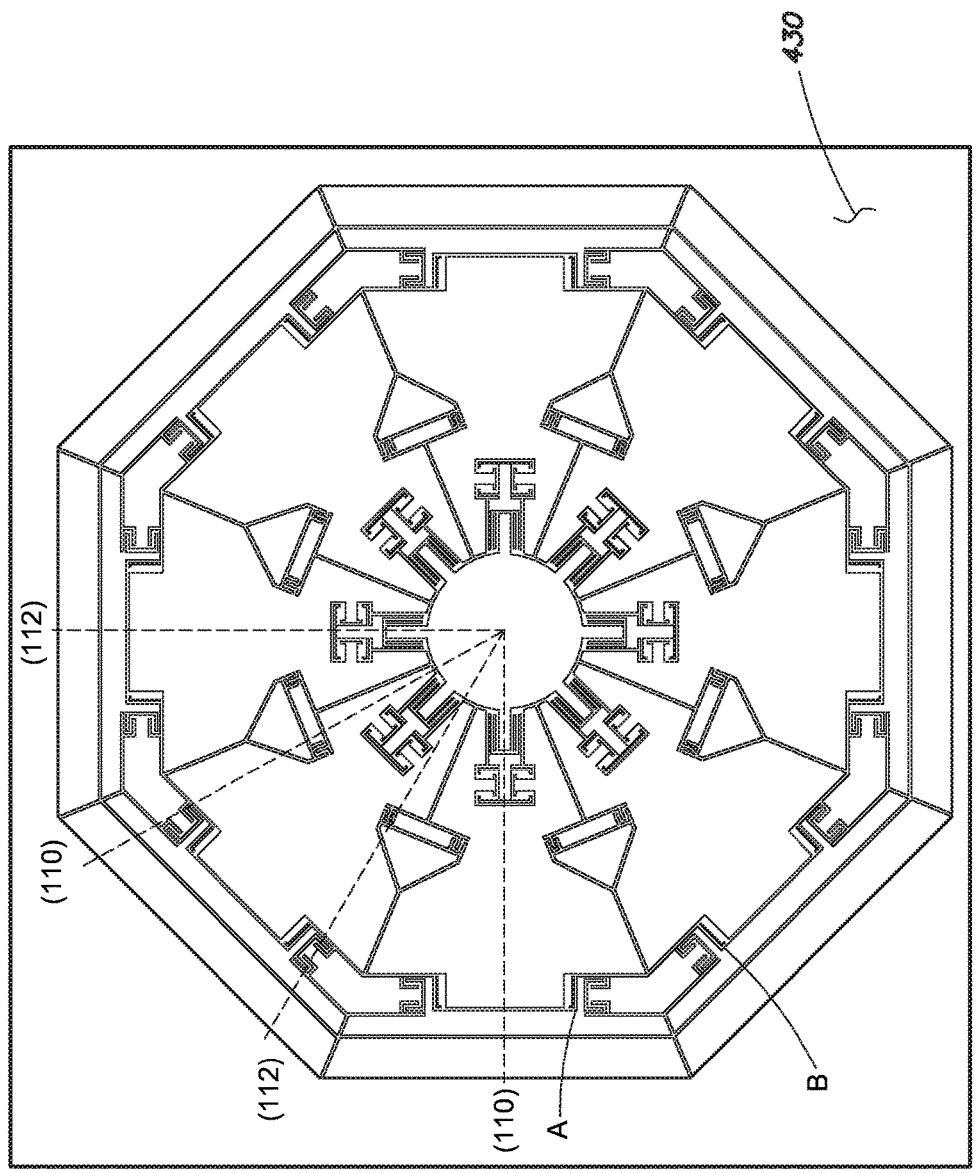
FIG. 5D is a diagram illustrating another embodiment of the orientation of a MEMS based gyroscope relative to the crystallographic orientation of a cubic crystal structure according to aspects of the present invention.

In another embodiment, planar isoelasticity in a cubic crystal based substrate (e.g., substrate 430) is achieved by utilizing a wafer with a (111) crystal orientation. For example, as shown in FIG. 5D, when the device is implemented on a cubic crystal based substrate 430 with a (111) crystal orientation, the in-plane directions are (110) and/or (112), all of which have the same modulus. The result is that all flexures having the same geometry will thus behave in the same way without requiring compensation (e.g., as described above with respect to the (100) crystal orientation).

Figure 5E:
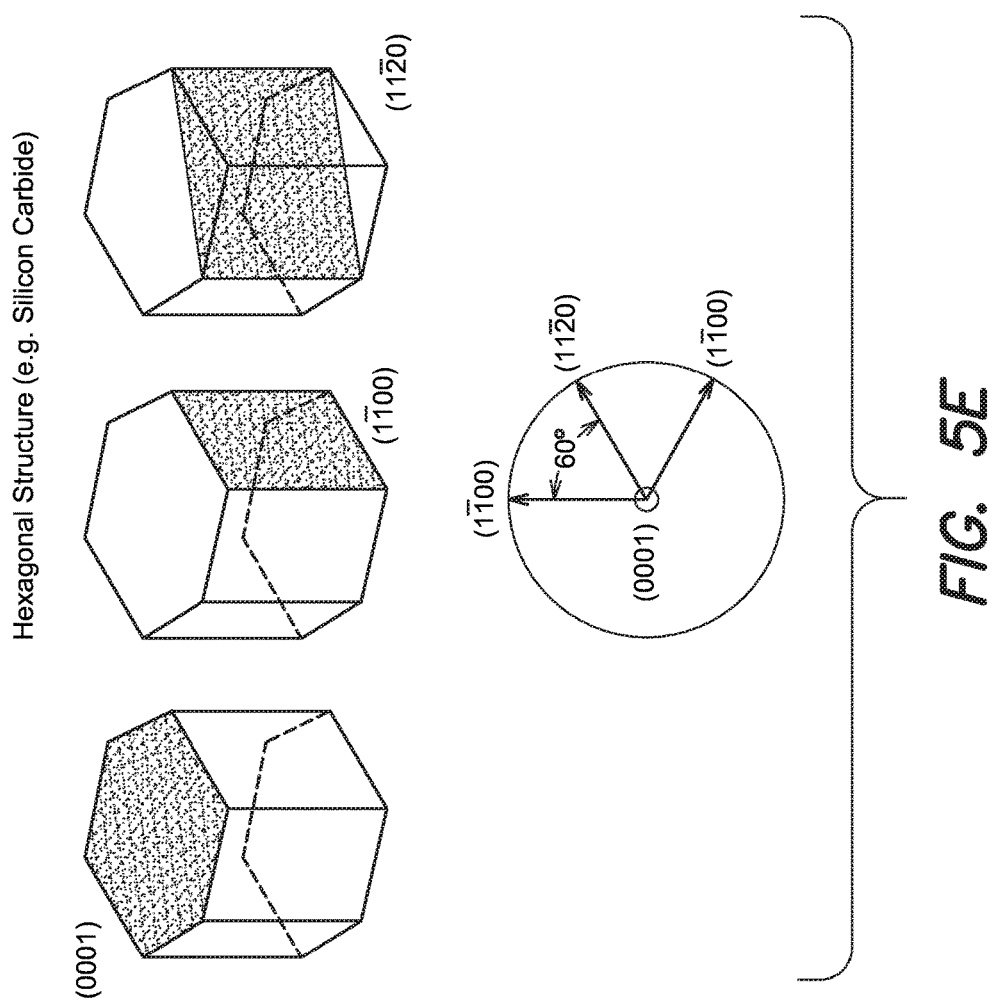
FIG. 5E is a diagram illustrating directional planes of a hexagonal crystal structure according to aspects of the present invention according to aspects of the present invention.
Figure 5F:
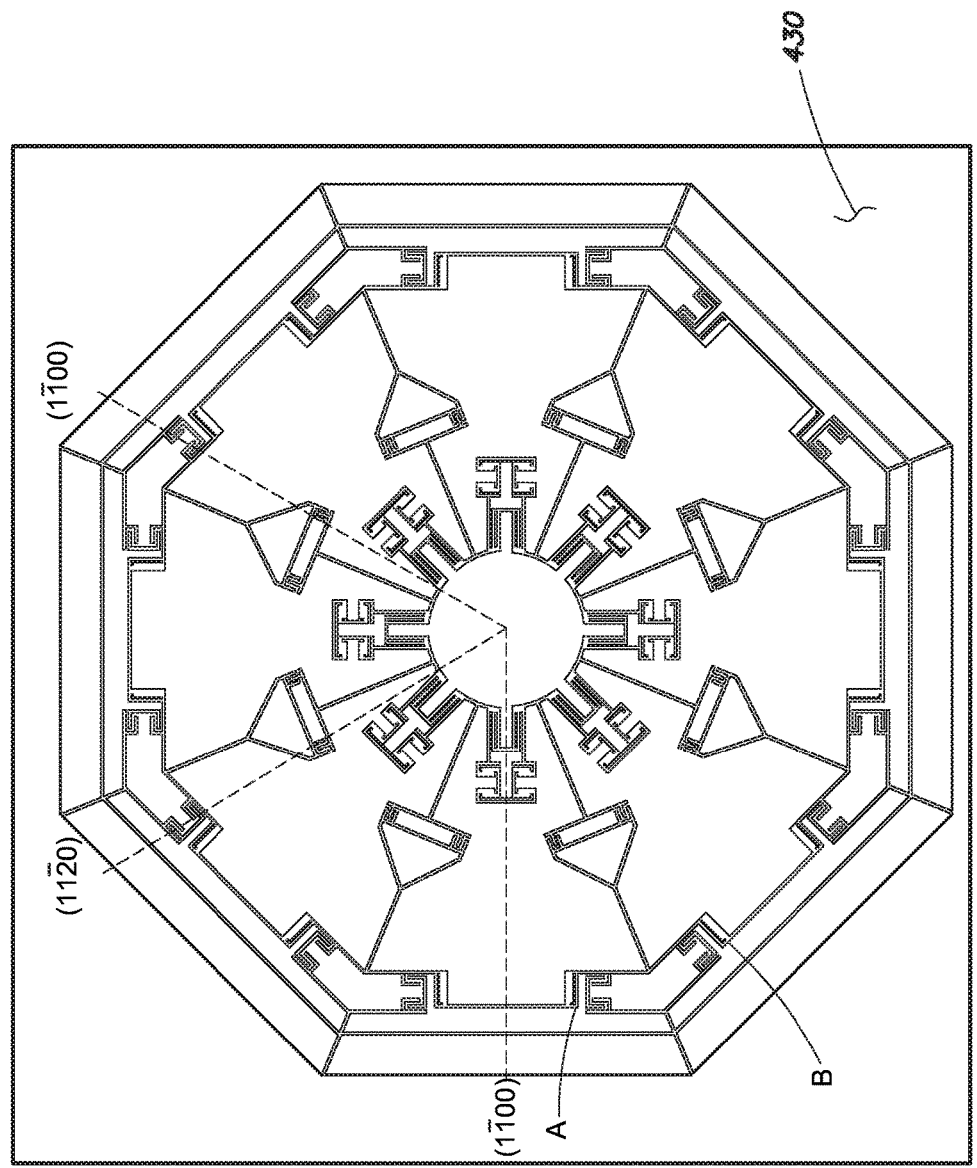
FIG. 5F is a diagram illustrating one embodiment of the orientation of a MEMS based gyroscope relative to the crystallographic orientation of a hexagonal crystal structure according to aspects of the present invention.

According to another embodiment, the MEMS based gyroscope 100 is implemented on a hexagonal crystal based substrate 430 (e.g., a Silicon Carbide (4H—SiC) based substrate). As illustrated in FIGS. 5E-5F, for wafers (i.e., substrates) oriented in the (0001) plane of a hexagonal crystal, the in-plane directions (($1\bar{1}00$) and ($11\bar{2}0$)) resemble those of a (111) plane oriented cubic crystal in that they have the same modulus. The result is that all flexures having the same geometry will thus behave in the same way without requiring compensation (e.g., as described above with respect to the (100) cubic crystal orientation). As illustrated in FIGS. 5D and 5F, whereas the cubic crystal axis repeats every 60°, the hexagonal crystal axes repeat every 120°. As discussed above, the MEMS based gyroscope 100 is implemented on a Silicon-Carbide based substrate; however, in other embodiments, the MEMS based gyroscope 100 can be implemented on any type of hexagonal crystal structure.

Figure 5G:
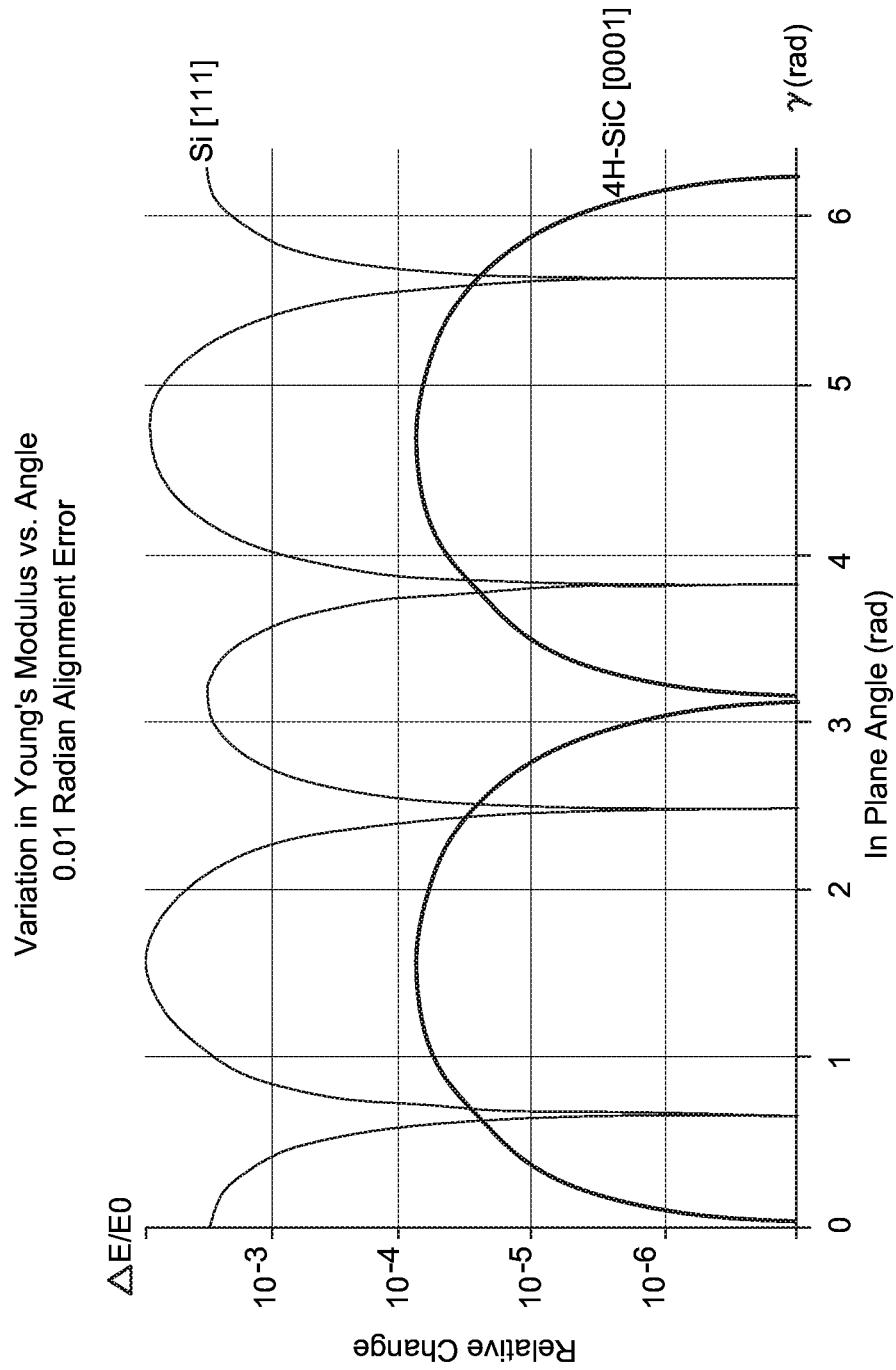
FIG. 5G is a graph illustrating the variation in Young's modulus between Silicon-Carbide (4H—SiC) and Silicon (Si).

Applicant has appreciated that in addition to not requiring compensation (e.g., rotation) to account for differences in stiffness (as discussed above), the use of a hexagonal crystal based substrate (e.g., substrate 430) is also advantageous because stiffness variations remain low even if the angle between the device plane and the crystallographic plane is imperfect. For example, FIG. 5G is a graph illustrating how Young's modulus, which quantifies the material contribution to stiffness, varies in silicon-carbide (4H—SiC) compared to silicon (Si). FIG. 5G assumes 0.01 radian planar misalignment. As shown in FIG. 5G, silicon-carbide is less sensitive to misalignment then silicon (by two orders of magnitude). Such low-sensitivity for misalignment holds for any hexagonal crystal whose stiffness along the principal direction is of the form:

$$C = \begin{bmatrix} c11 & c12 & c13 & 0 & 0 & 0 \\ c12 & c11 & c13 & 0 & 0 & 0 \\ c13 & c13 & c33 & 0 & 0 & 0 \\ 0 & 0 & 0 & c44 & 0 & 0 \\ 0 & 0 & 0 & 0 & c44 & 0 \\ 0 & 0 & 0 & 0 & 0 & \frac{c11-c12}{2} \end{bmatrix}.$$

A single-crystal 4H—SiC substrate (or material layer), for example substrate 430 shown in FIG. 5F, may have an approximately on-axis orientation of (0001) with the first surface (top surface) of the 4H—SiC substrate (or material layer) being a silicon face and the second surface (bottom surface) of the 4H—SiC material being a carbon face having an approximate on-axis orientation of (000$\bar{1}$). In some embodiments, a single-crystal 4H—SiC material or substrate may have an on-axis orientation in the range of 0 degree+/−0.1 degree. In other embodiments, a single-crystal 4H—SiC material or substrate may have an on-axis orientation in the range of 0 degree+/−0.5 degree. Electrostatic coupling to a 4H—SiC beam may require that the beam have an electrical conductivity and thus the on-axis 4H—SiC material may be doped N-type or P-type. According to at least one embodiment, the on-axis 4H—SiC substrate (or material) is N-type doped with a doping concentration in the range of $5\times10^{18}$ cm$^3$ to $1\times10^{19}$ cm$^{-3}$; however, in other embodiments, a different doping concentration may be utilized. Suspended beams (i.e., flexures) in silicon carbide (4H—SiC) can be made from bulk 4H—SiC substrates or from epitaxial layers grown on bulk 4H—SiC or silicon substrates.

A single-crystal 4H—SiC substrate (or material layer), for example substrate 430 shown in FIG. 5F, may have an off-axis orientation with respect to the (0001) c-axis, with the first surface (top surface) of the 4H—SiC substrate (or material layer) being a silicon face and the second surface (bottom surface) of the 4H—SiC material being a carbon face having off-axis orientation with respect to (000$\bar{1}$) c-axis. The off-axis orientation can be in the range of 0.5 to 10 degrees with respect to the (0001) axis. The accuracy of the off-axis orientation can be as low as +/−0.1 degree. The off-axis 4H—SiC substrate (or material) may be doped N-type of P-type. According to one embodiment, the off-axis 4H—SiC substrate (or material) is N-type doped using nitrogen dopant atoms; however, in other embodiments, another type of dopant atoms may be utilized. According to at least one embodiment, an N-type SiC substrate has a 4 degree or 8 degree off-axis orientation with respect to the (0001) axis. In one embodiment, the substrate 430 is an N-type off-axis or on-axis SiC substrate manufactured by Cree, Inc. of Durham, N.C. or II-VI Incorporated of Saxonburg, Pa.

According to one embodiment, the epitaxial growth of 4H—SiC single-crystal SiC material layers on the silicon face of a hexagonal single-crystal SiC bulk substrate requires the use of off-axis orientation from the (0001) c-axis of more than about 2 degrees. In other embodiments, the epitaxial growth of 4H—SiC single-crystal SiC material layers on the silicon face of a hexagonal single-crystal SiC bulk substrate requires the use of off-axis orientation from the (0001) c-axis of more than 4 degrees. In another embodiment, the epitaxial growth of 4H—SiC single-crystal SiC material layers on the silicon face of a hexagonal single-crystal SiC bulk substrate requires the use of off-axis orientation from the (0001) c-axis of more than about 8 degrees. The 4H—SiC epitaxial layers grown on the silicon face can be doped N-type or P-type to a selected doping level.

4H—SiC single-crystal SiC material layers can also be grown on the carbon face of 4H—SiC single-crystal substrates. Similar to the epitaxial growth of 4H—SiC single-crystal SiC material layers on a silicon face as described above, the epitaxial growth of 4H—SiC single-crystal SiC material layers on the carbon face of a hexagonal single-crystal SiC bulk substrate requires the use of off-axis orientation from the (0001) c-axis of more than about 2 degrees in some embodiments, more than 4 degrees in some embodiments, and more than about 8 degrees in some embodiments. The 4H—SiC epitaxial layers grown on the carbon face can be doped N-type or P-type to a selected doping level. According to other embodiments, a hexagonal crystal based substrate 430 (e.g., a Silicon Carbide (4H—SiC) based substrate) may be constructed in another appropriate way.

As described above, a MEMS based gyroscope having an axially symmetric structure including relatively large masses (coupled via mass-to-mass couplers) on relatively weak flexures (e.g., the MEMS based gyroscope 100 shown in FIG. 1) can be implemented on a hexagonal crystal based substrate (e.g., substrate 430). However, in other embodiments, another type of gyroscope (e.g., a ring gyroscope, disk gyroscope, quad-mass gyroscope, etc.) including another type of axially symmetric structure (e.g., a ring, a disk, other symmetrically coupled masses, etc.) configured to be driven in two vibratory modes of the structure can also be implemented on a hexagonal crystal based substrate.

Figure 6A:
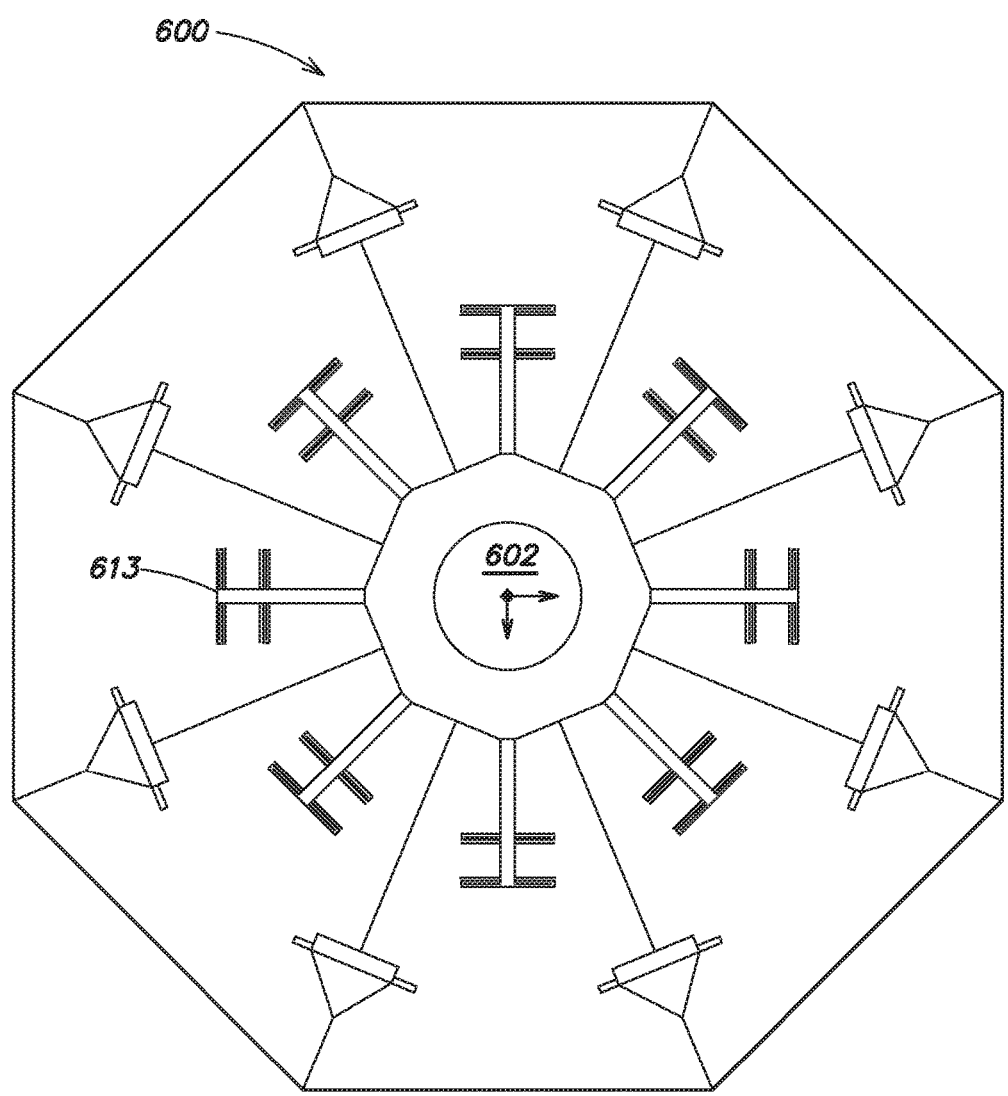
FIG. 6A is a diagram of another embodiment of a MEMS based gyroscope according to aspects of the present invention.

FIG. 6A is a diagram illustrating another embodiment of a MEMS based gyroscope 600 configured according to aspects of the present disclosure. The gyroscope 600 is the same as gyroscope 100 discussed above with regard to FIG. 1 except that the gyroscope 600 does not include outside anchors (e.g., such as outside anchors 114 shown in FIG. 1) or outside shuttles (e.g., such as outside shuttles 112 shown in FIG. 1). In addition, the internal shuttles 613 are configured differently. A benefit of such a configuration is that internal stress (which may arise from such causes as thermal expansion coefficient mismatches between the gyroscope material and the substrate material connecting a central anchor 602 and any outside anchors) are avoided. Such thermal mismatches between materials connecting the two anchors may result in the stretching of masses/flexures suspended between the two anchors. By only including one central anchor 602 in the gyroscope 600, such stretching may be avoided. Additionally, the bias stability of the gyroscope 600 may be improved by reducing the transmission of (unpredictable) external stresses on the gyroscope 600. However, by only including one central anchor 602, the force isolation (i.e., decoupling x- and y-motion as discussed above with regard to FIG. 2) provided by the outer shuttles and anchors is eliminated.

Figure 6B:
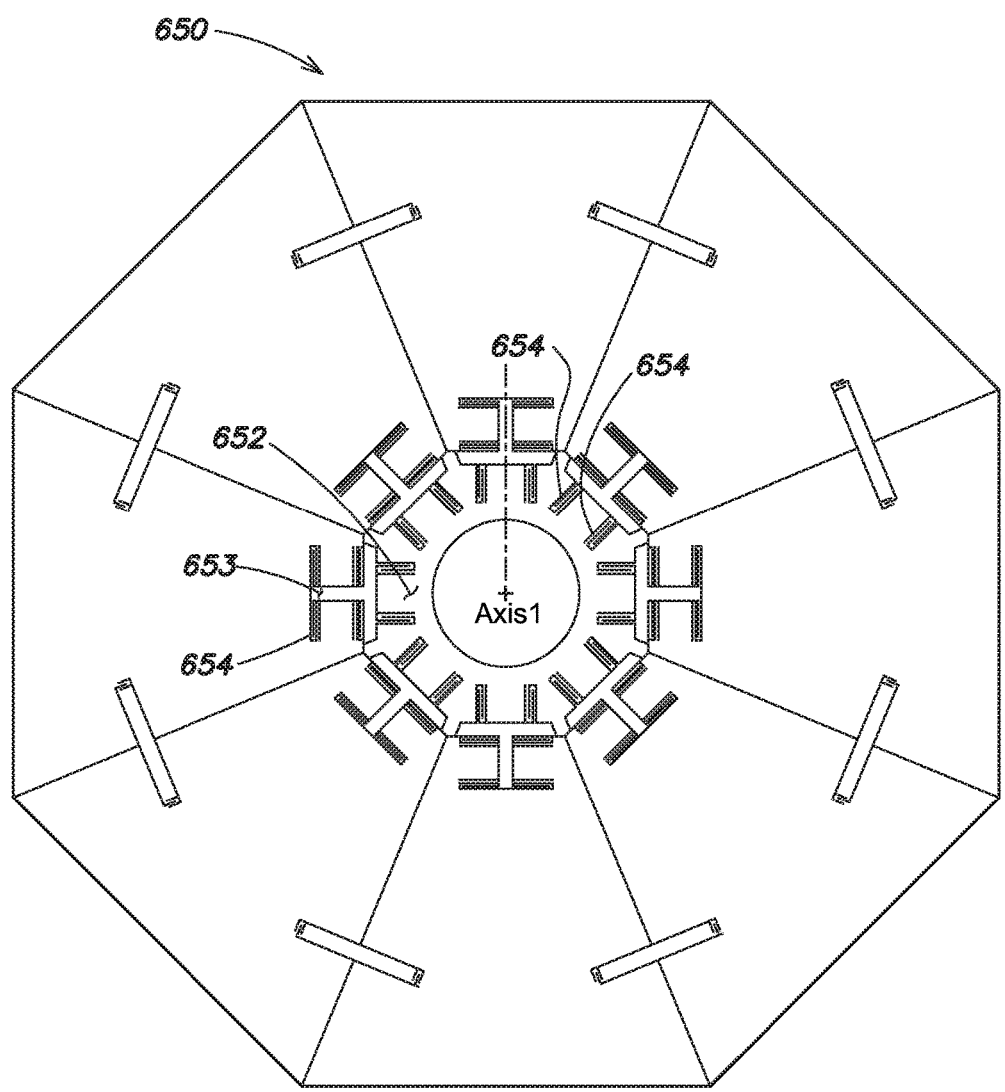
FIG. 6B is a diagram of another embodiment of a MEMS based gyroscope according to aspects of the present invention.

FIG. 6B is a diagram illustrating another embodiment of a MEMS based gyroscope 650 configured according to aspects of the present disclosure. The gyroscope 650 is similar to the gyroscope 600 discussed above with regard to FIG. 6A except that the gyroscope 650 does not include angled electrodes (e.g., such as the angled electrodes 118 shown in FIG. 1), and the anchor 652, internal flexures 654, and internal shuttles 653 are configured differently. FIG. 6C is a diagram illustrating further details of the anchor 652, internal flexures 654, and internal shuttle 653 of the gyroscope 650.

Figure 6D:
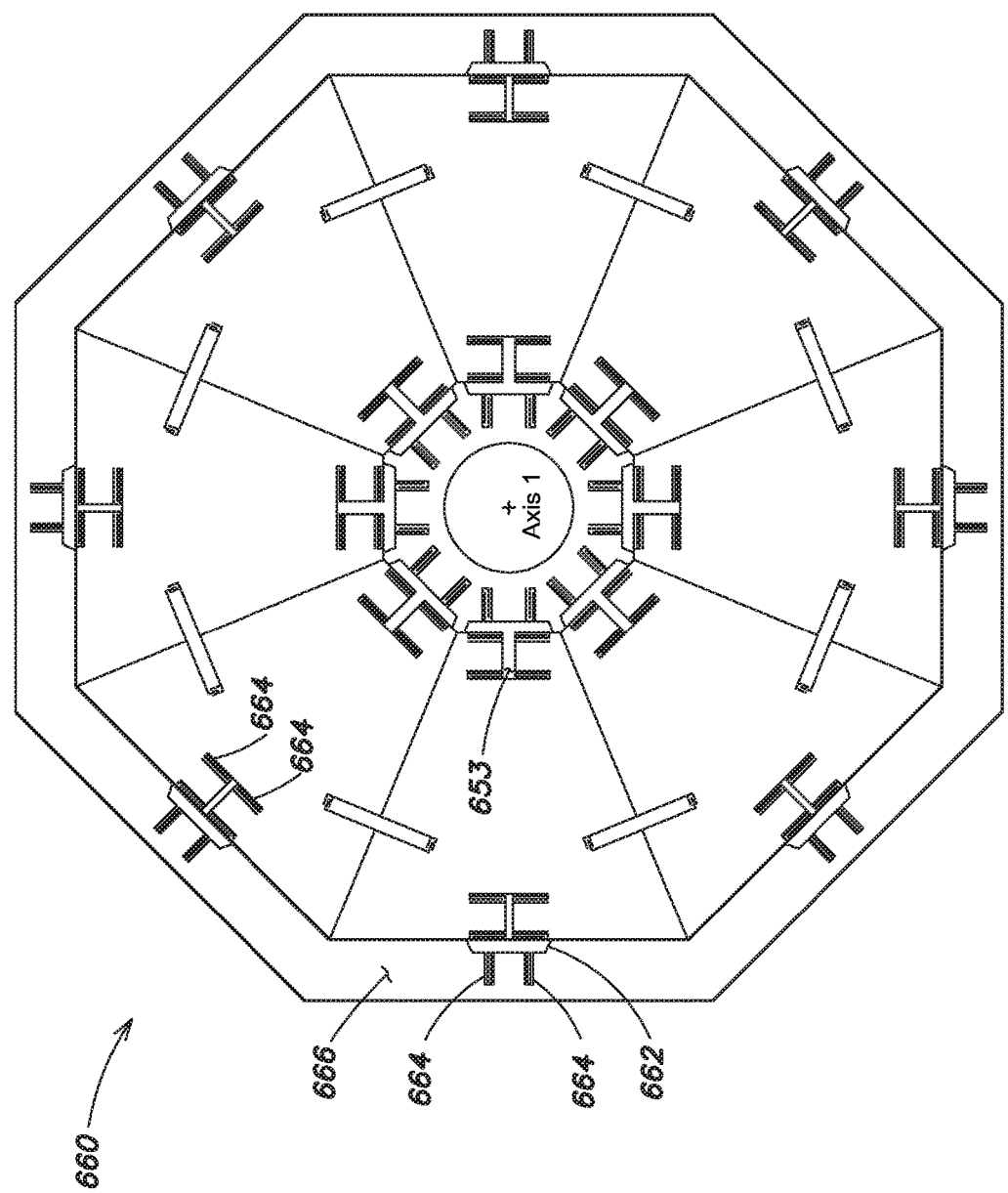
FIG. 6D is a diagram of another embodiment of a MEMS based gyroscope according to aspects of the present invention.

FIG. 6D is a diagram illustrating another embodiment of a MEMS bases gyroscope 660 configured according to aspects of the present disclosure. The gyroscope 660 is similar to the gyroscope 650 discussed above with regard to FIG. 6B except that the gyroscope 650 includes outer shuttles 662, outer flexures 664, and outer anchors 666. FIG. 6E is a diagram illustrating further details of the outer shuttles 662, outer flexures 664, and outer anchors 666. According to one embodiment, the internal shuttles 653 and outer shuttles 662 are identical. This may simplify the design process of the gyroscope 660 and also has the benefit of being more symmetric. The outer shuttles 662 and inner shuttles 653 are both configured to move in a circumferential direction and not in a radial direction (e.g., differently than discussed above with regard to FIG. 1).

FIG. 6F is a diagram illustrating another embodiment of a MEMS based gyroscope 680 configured according to aspects of the present disclosure. The gyroscope 680 is substantially the same as the gyroscope 660 discussed above with regard to FIG. 6D except that the outer shuttles, outer flexures and outer anchors are configured differently. For example, as shown in FIG. 6F, the gyroscope 680 includes outer shuttles 682, outer flexures 684, and outer anchors 686.

Figure 7A:
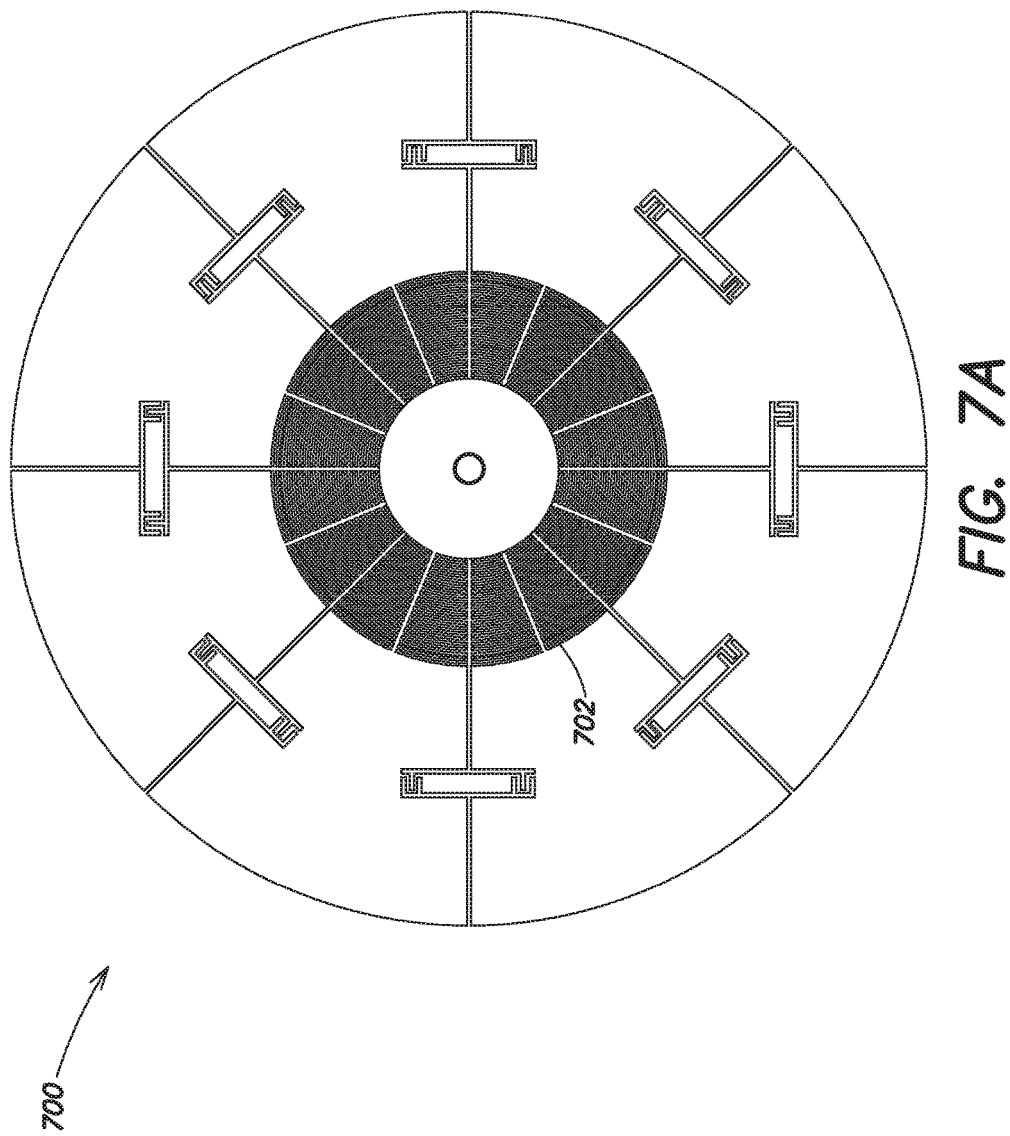
FIG. 7A is a diagram of another embodiment of a MEMS based gyroscope according to aspects of the present invention.
Figure 7B:
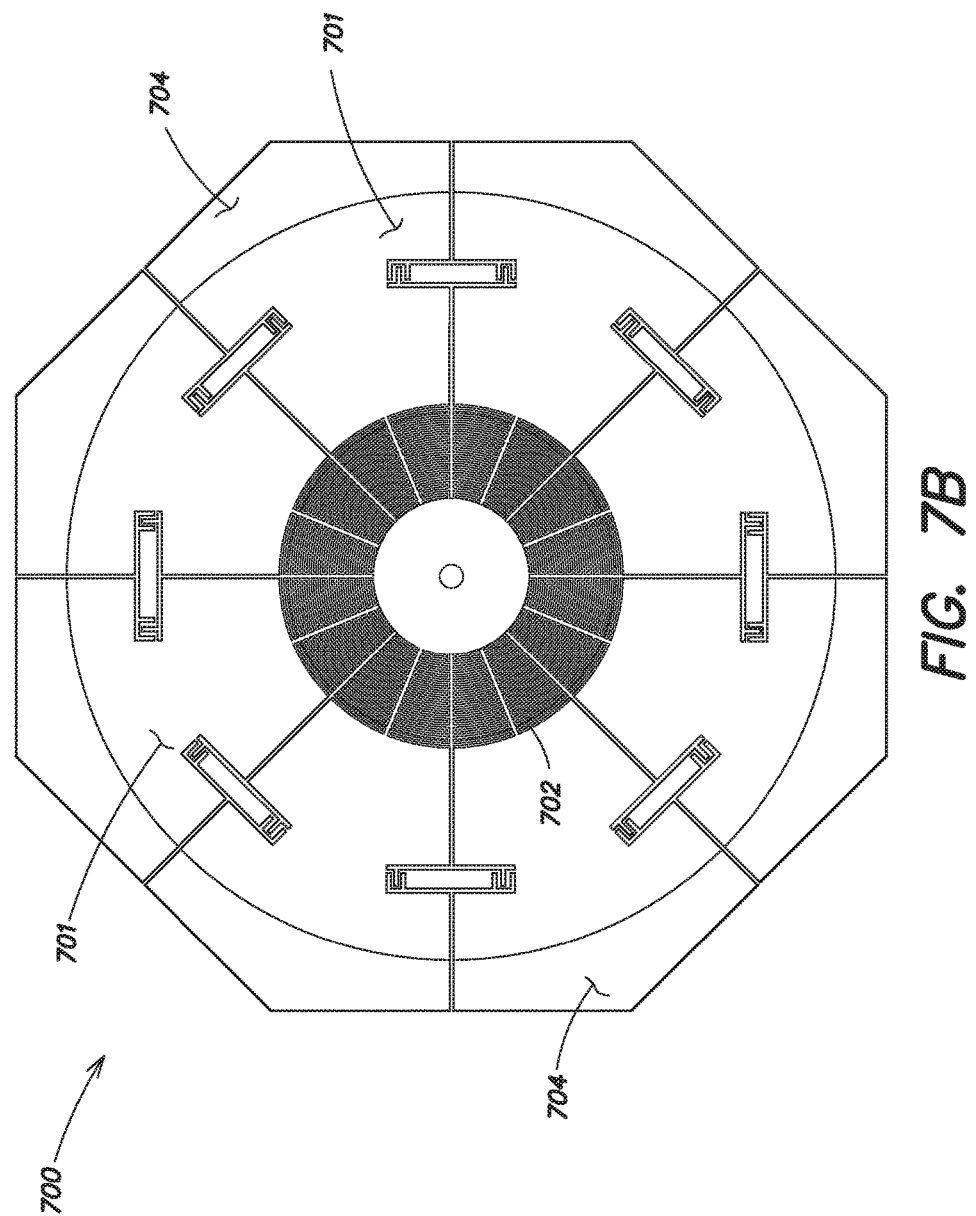
FIG. 7B is a diagram of another embodiment of a MEMS based gyroscope according to aspects of the present invention.

FIG. 7A is a diagram illustrating another embodiment of a MEMS based gyroscope 700 configured according to aspects of the present disclosure. The gyroscope 700 is similar to the gyroscope 100 discussed above with regard to FIG. 1 except that the gyroscope 700 does not include outside anchors or outside shuttles (e.g., as discussed above with regard to FIG. 6), does not include internal shuttles (e.g., such as internal shuttles 113 shown in FIG. 1) and the flexures 702 are configured differently in a serpentine configuration. FIG. 7B is a diagram illustrating the MEMS based gyroscope 700 and outer clapper electrodes 704 adjacent each mass 701 of the gyroscope 700. The outer clapper electrodes 704 are part of adjacent drive/sense transducers (e.g., the drive/sense transducers 116 shown in FIG. 1) utilized to drive and sense motion of the masses 701.

Figure 9:
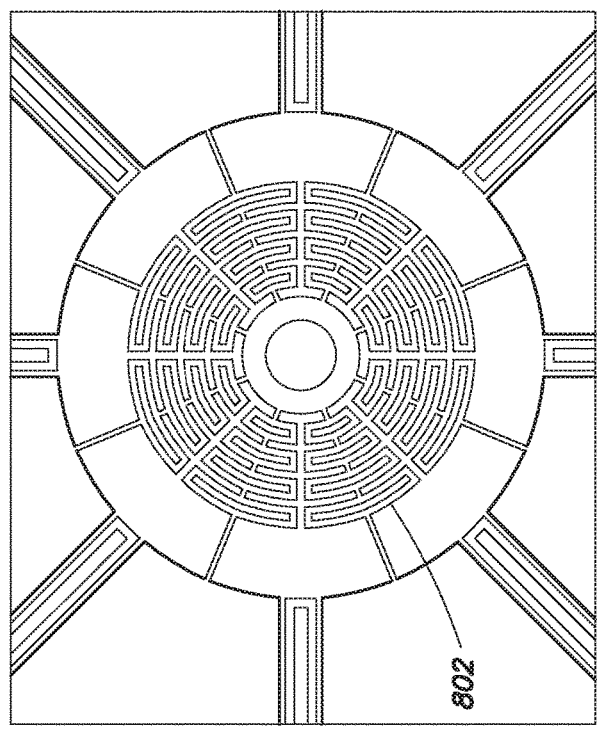
FIG. 9 is a diagram illustrating further detail of the MEMS based gyroscope shown in FIG. 8 according to aspects of the present invention.
Figure 10:
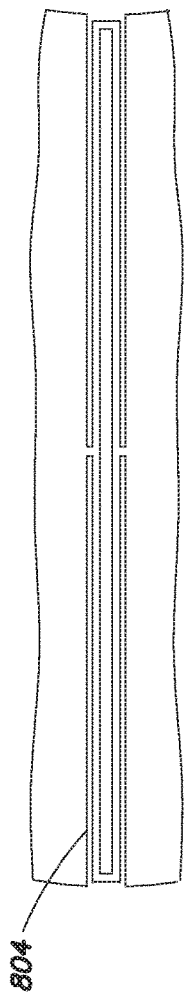
FIG. 10 is a diagram illustrating further detail of the MEMS based gyroscope shown in FIG. 8 according to aspects of the present invention.

FIG. 8 is a diagram illustrating another embodiment of a MEMS based gyroscope 800 configured according to aspects of the present disclosure. The gyroscope 800 is similar to the gyroscope 100 discussed above with regard to FIG. 1 except that the gyroscope 800 does not include outside anchors or outside shuttles (e.g., as discussed above with regard to FIG. 6), does not include internal shuttles (e.g., such as internal shuttles 113 shown in FIG. 1) and the flexures 802 are configured differently in a stacked configuration. FIG. 9 is a diagram illustrating further details of the stacked configuration of flexures 802. In addition, unlike the mass-to-mass couplers 108 shown in FIG. 1, the gyroscope 800 utilizes different mass-to-mass couplers 804 to couple together adjacent masses. FIG. 10 is a diagram illustrating further details of a mass-to-mass coupler 804. The mass-to-mass coupler 804 is more stiff in the radial direction and more soft in the circumferential direction.

Figure 11:
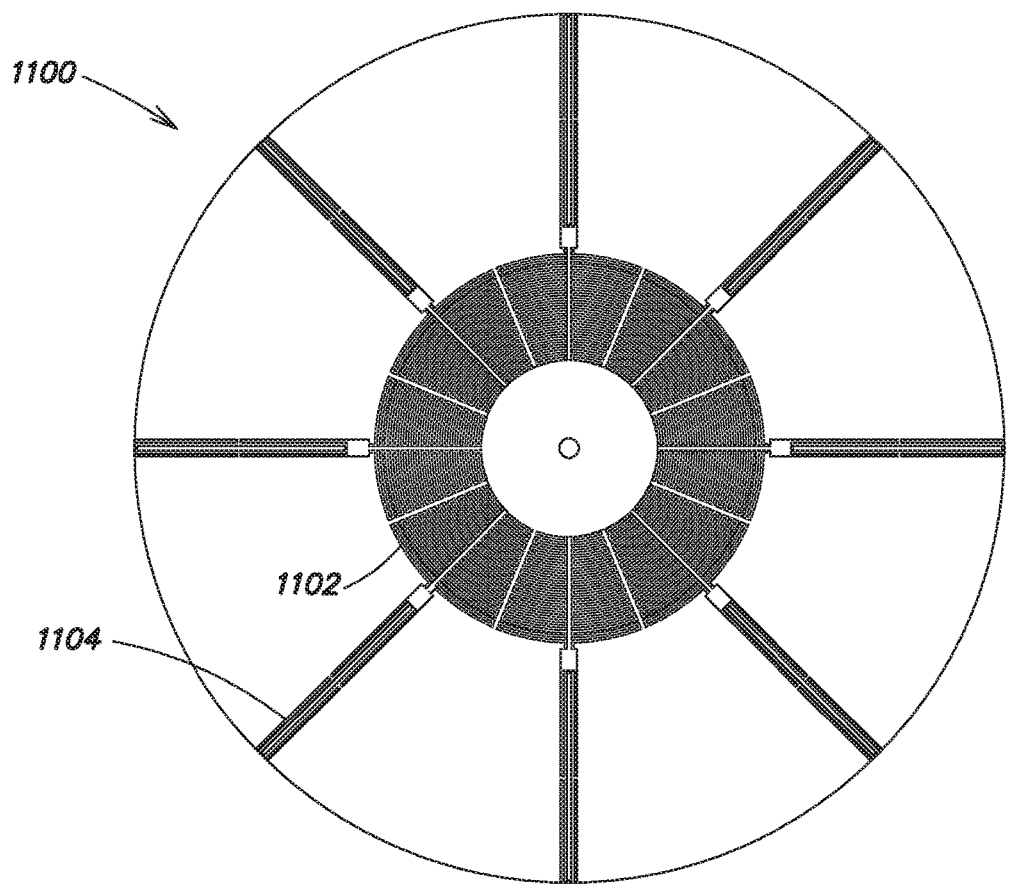
FIG. 11 is a diagram of another embodiment of a MEMS based gyroscope according to aspects of the present invention.

FIG. 11 is a diagram illustrating another embodiment of a MEMS based gyroscope 1100 configured according to aspects of the present disclosure. The gyroscope 1100 is similar to the gyroscope 100 discussed above with regard to FIG. 1 except that the gyroscope 1100 does not include outside anchors or outside shuttles (e.g., as discussed above with regard to FIG. 6), does not include internal shuttles (e.g., such as internal shuttles 113 shown in FIG. 1) and the flexures 1102 are configured differently in a serpentine configuration. In addition, unlike the mass-to-mass couplers 108 shown in FIG. 1, the gyroscope 1100 utilizes mass-to-mass flexures 1104 (e.g., as shown in FIG. 10) to couple together adjacent masses.

Figure 12:
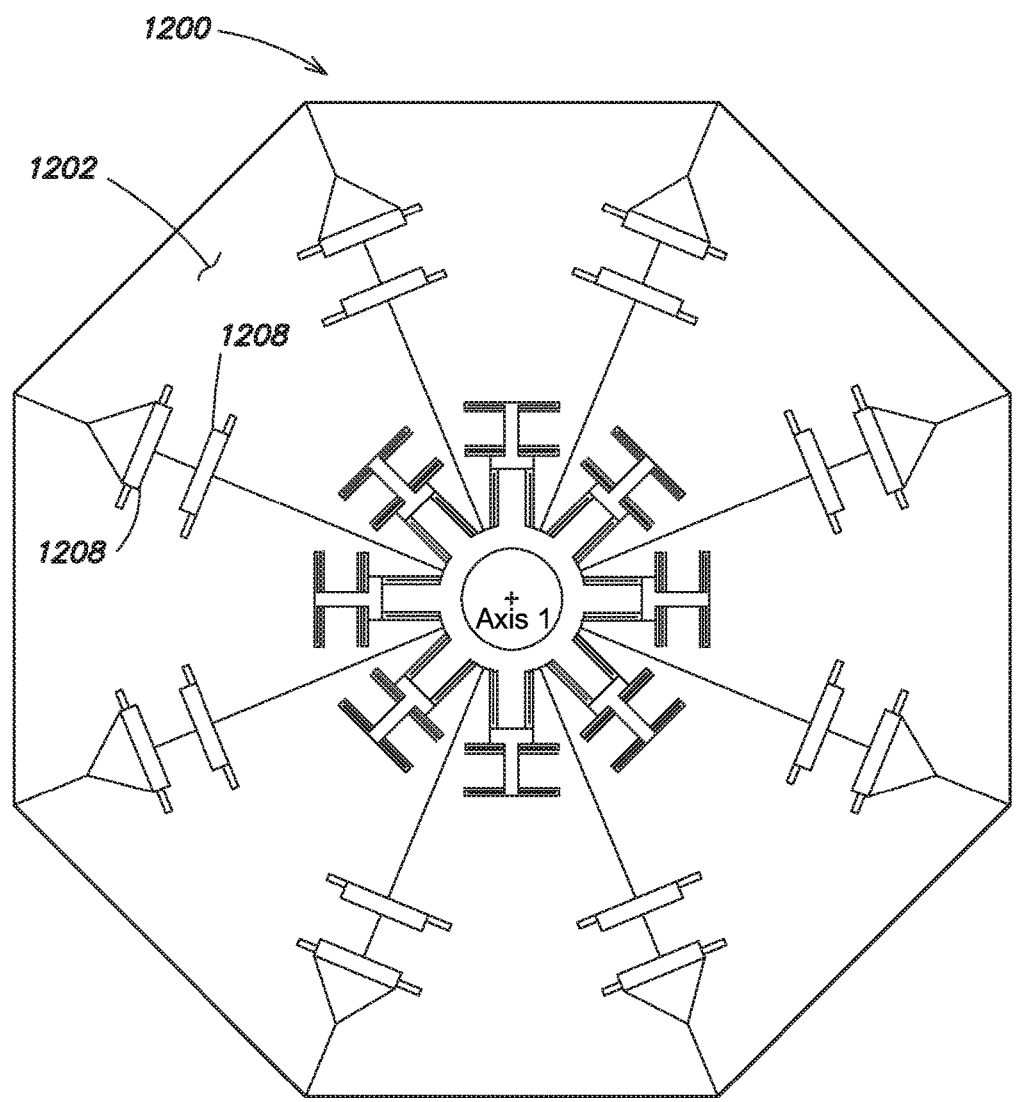
FIG. 12 is a diagram of another embodiment of a MEMS based gyroscope according to aspects of the present invention.

FIG. 12 is a diagram illustrating another embodiment of a MEMS based gyroscope 1200 configured according to aspects of the present disclosure. The gyroscope 1200 is similar to the gyroscope 100 discussed above with regard to FIG. 1 except that the gyroscope 1200 includes two mass-to-mass couplers 1208 coupled between each adjacent mass 1202, and the flexural hinges on the couplers are straight instead of folded.

Figure 13:
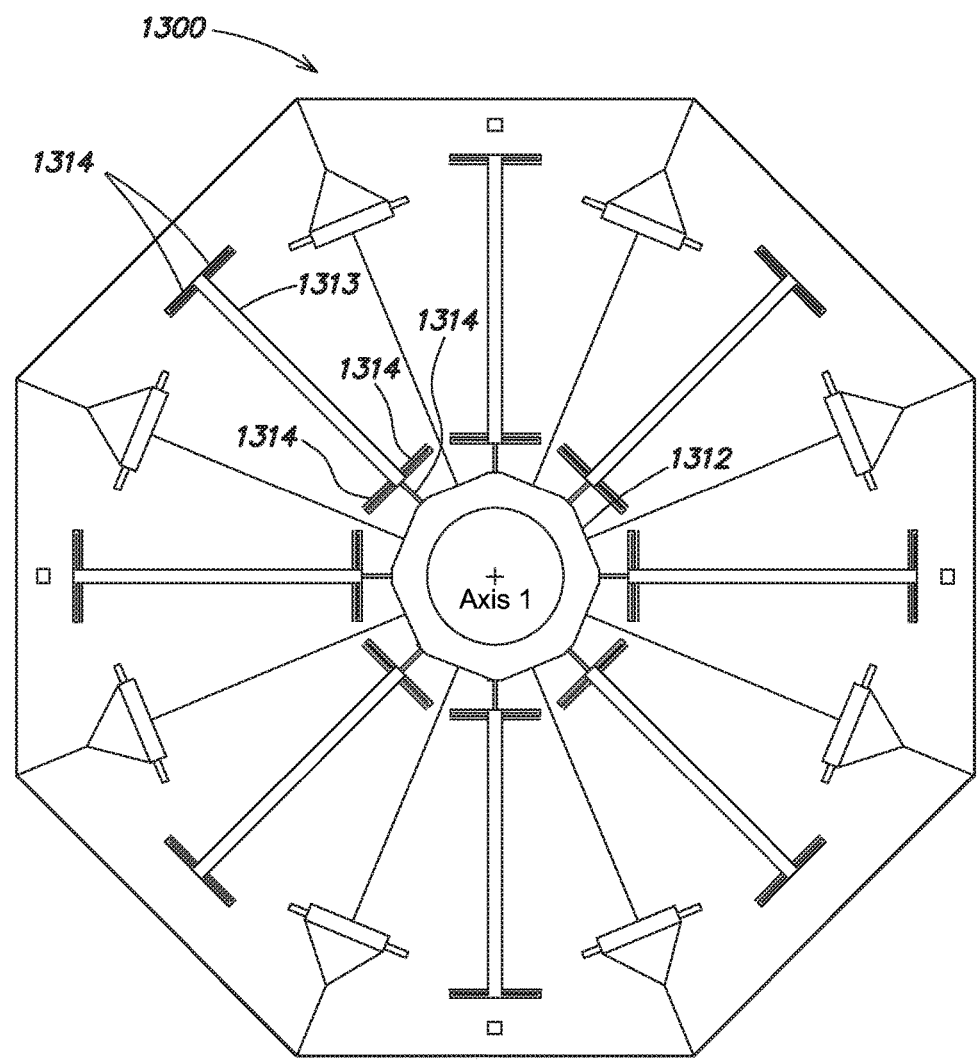
FIG. 13 is a diagram of another embodiment of a MEMS based gyroscope according to aspects of the present invention.

FIG. 13 is a diagram illustrating another embodiment of a MEMS based gyroscope 1300 configured according to aspects of the present disclosure. The gyroscope 1300 is similar to the gyroscope 100 discussed above with regard to FIG. 1 except that the gyroscope 1300 does not include outside anchors (e.g., such as outside anchors 114 shown in FIG. 1) or outside shuttles (e.g., such as outside shuttles 112 shown in FIG. 1), and the internal flexures 1314, internal shuttles 1313, and anchor 1312 are configured differently. For example, as shown in FIG. 13, the internal shuttles 1313 are extended length shuttles.

Figure 14:
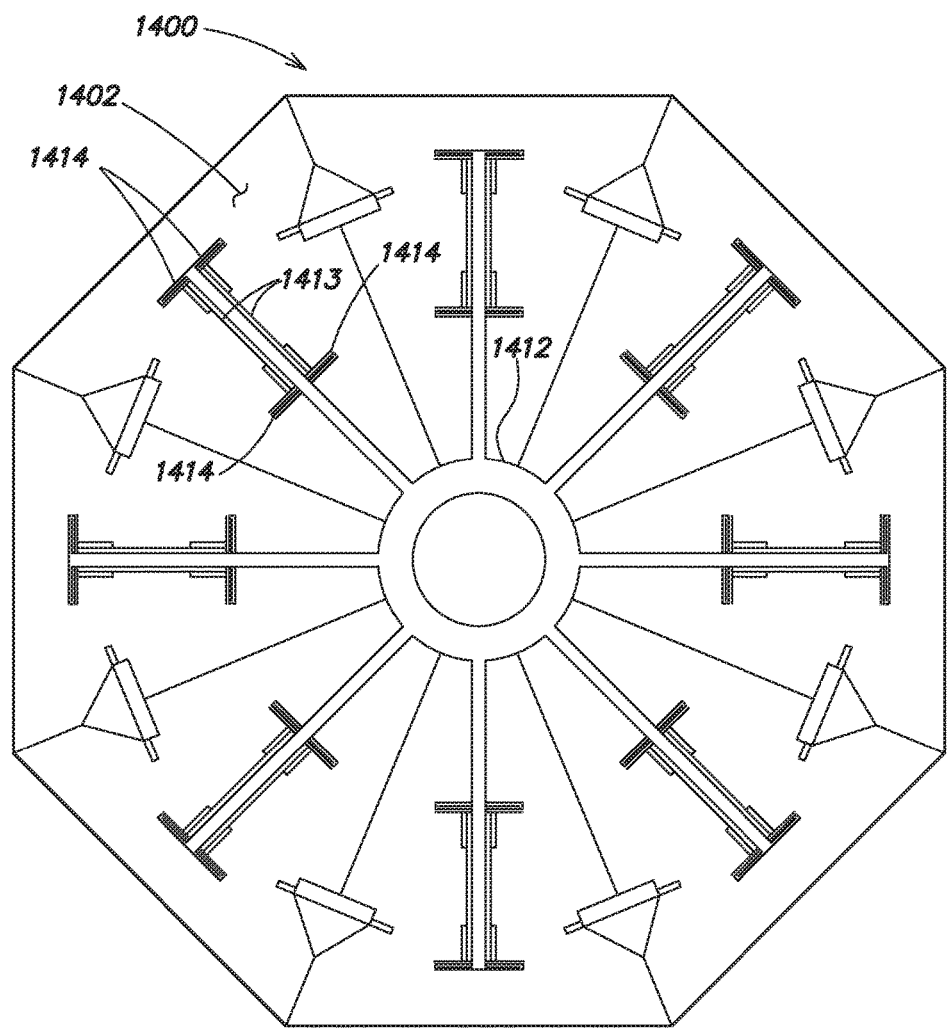
FIG. 14 is a diagram of another embodiment of a MEMS based gyroscope according to aspects of the present invention.

FIG. 14 is a diagram illustrating another embodiment of a MEMS based gyroscope 1400 configured according to aspects of the present disclosure. The gyroscope 1400 is similar to the gyroscope 100 discussed above with regard to FIG. 1 except that the gyroscope 1400 does not include outside anchors (e.g., such as outside anchors 114 shown in FIG. 1) or outside shuttles (e.g., such as outside shuttles 112 shown in FIG. 1), and the internal flexures 1414, internal shuttles 1413, and anchor 1412 are configured differently. For example, as shown in FIG. 14, each mass 1402 includes two extended length internal shuttles 1413 and the anchor 1412 extends into each mass 1402.

Figure 15:
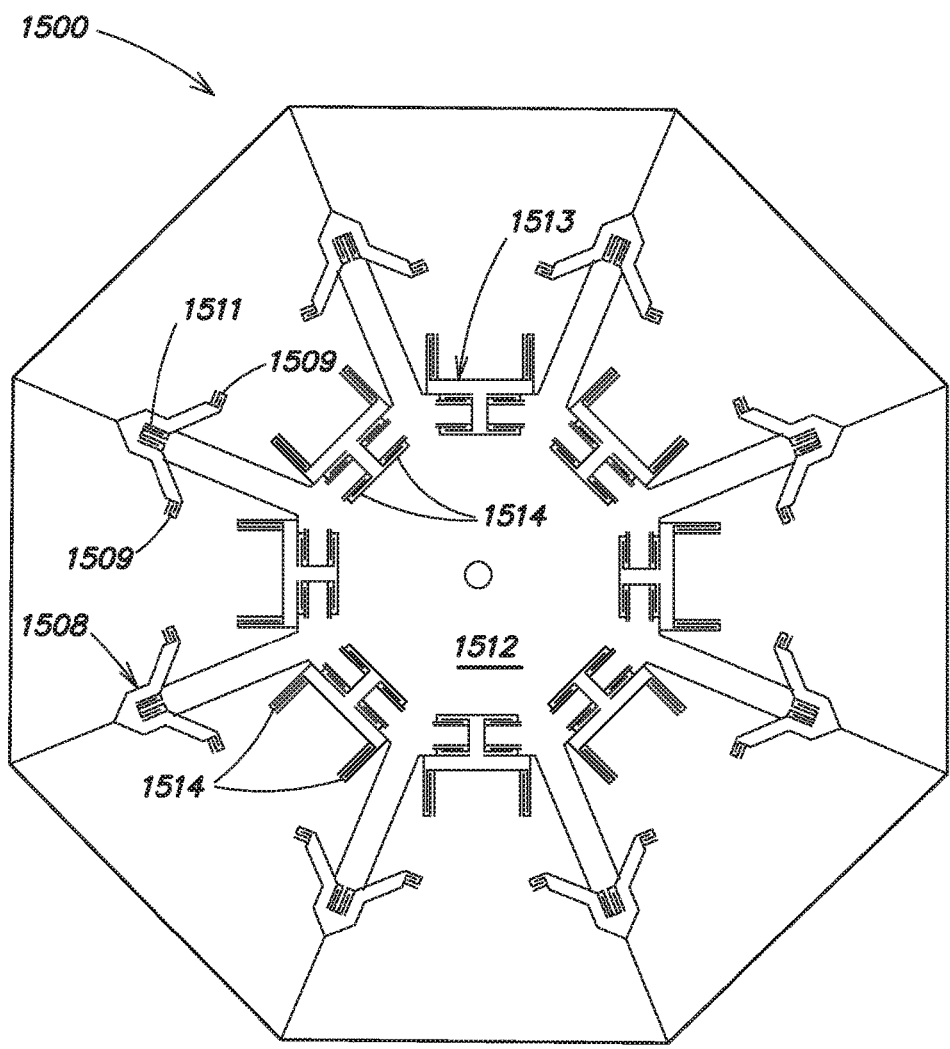
FIG. 15 is a diagram of another embodiment of a MEMS based gyroscope according to aspects of the present invention.
Figure 16:
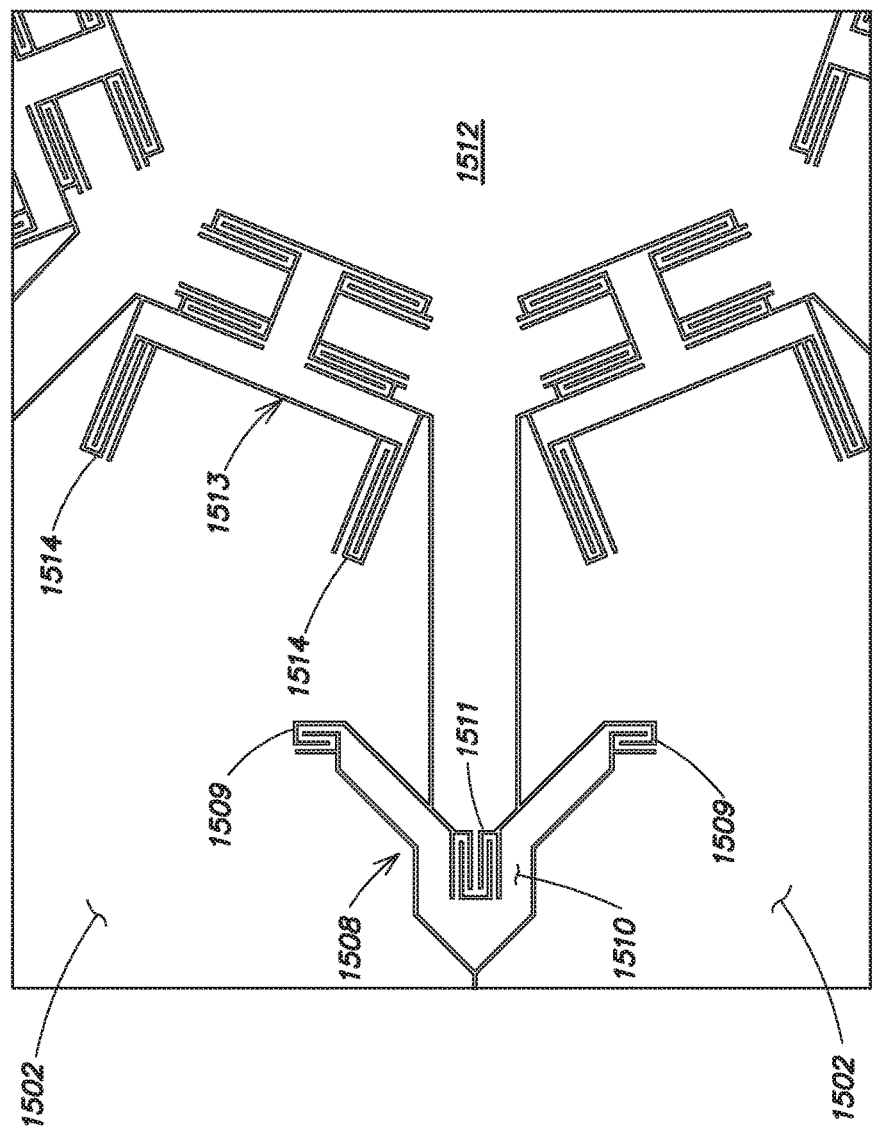
FIG. 16 is a diagram illustrating further detail of the MEMS based gyroscope shown in FIG. 15 according to aspects of the present invention.

FIG. 15 is a diagram illustrating another embodiment of a MEMS based gyroscope 1500 configured according to aspects of the present disclosure. The gyroscope 1500 is similar to the gyroscope 100 discussed above with regard to FIG. 1 except that the gyroscope 1500 does not include outside anchors (e.g., such as outside anchors 114 shown in FIG. 1) or outside shuttles (e.g., such as outside shuttles 112 shown in FIG. 1), and the internal flexures 1514, internal shuttles 1513, anchor 1512, and mass-to-mass couplers 1508 are configured differently. FIG. 16 is a diagram illustrating further detail regarding the internal flexures 1514, internal shuttles 1513, anchor 1512, and mass-to-mass coupler 1508. The anchor 1512 extends between each mass 1502. The mass-to-mass coupler 1508 includes a "stiff" bar 1510 that is coupled between adjacent masses 1502 via flexural hinges 1509. The bar 1510 is also coupled to the anchor 1512 via a flexural hinge 1511.

Figure 17B:
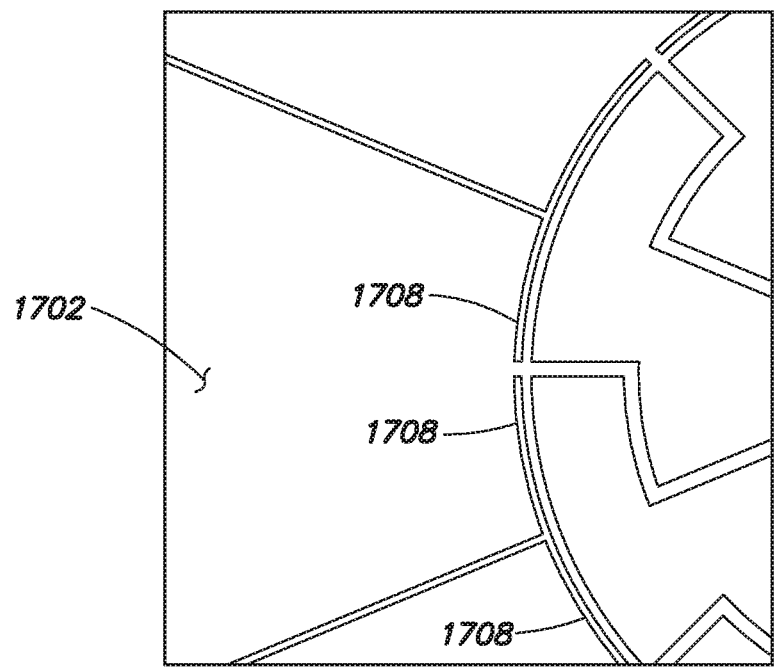
FIG. 17B is a diagram illustrating further detail of the MEMS based gyroscope shown in FIG. 17A according to aspects of the present invention.
Figure 17C:
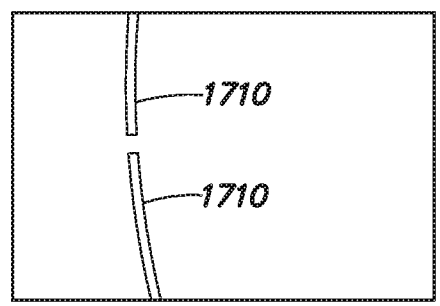
FIG. 17C is a diagram illustrating further detail of the MEMS based gyroscope shown in FIG. 17A according to aspects of the present invention.

FIG. 17A is a diagram illustrating another embodiment of a MEMS based gyroscope 1700 configured according to aspects of the present disclosure. The gyroscope 1700 is similar to the gyroscope 100 discussed above with regard to FIG. 1 except that the gyroscope 1700 does not include outside anchors (e.g., such as outside anchors 114 shown in FIG. 1) or outside shuttles (e.g., such as outside shuttles 112 shown in FIG. 1), and the internal flexures 1714, anchor 1712, and mass-to-mass couplers are configured differently. As shown in the gyroscope 1700 of FIG. 17, the mass-to-mass coupler includes an internal ring 1708 and an external ring 1710 which are configured to couple together adjacent masses 1702. For example, FIGS. 17B and 17C are diagrams illustrating further detail of the internal ring 1708 and the external ring 1710. According to one embodiment, the internal ring 1708 and external ring 1710 are single continuous rings. In another embodiment, the internal ring 1708 may include multiple independent portions, each portion configured to couple together two adjacent masses 1702. Similarly, the external ring 1710 may include multiple independent portions, each portion configured to couple together two adjacent masses 1702.

Figure 18:
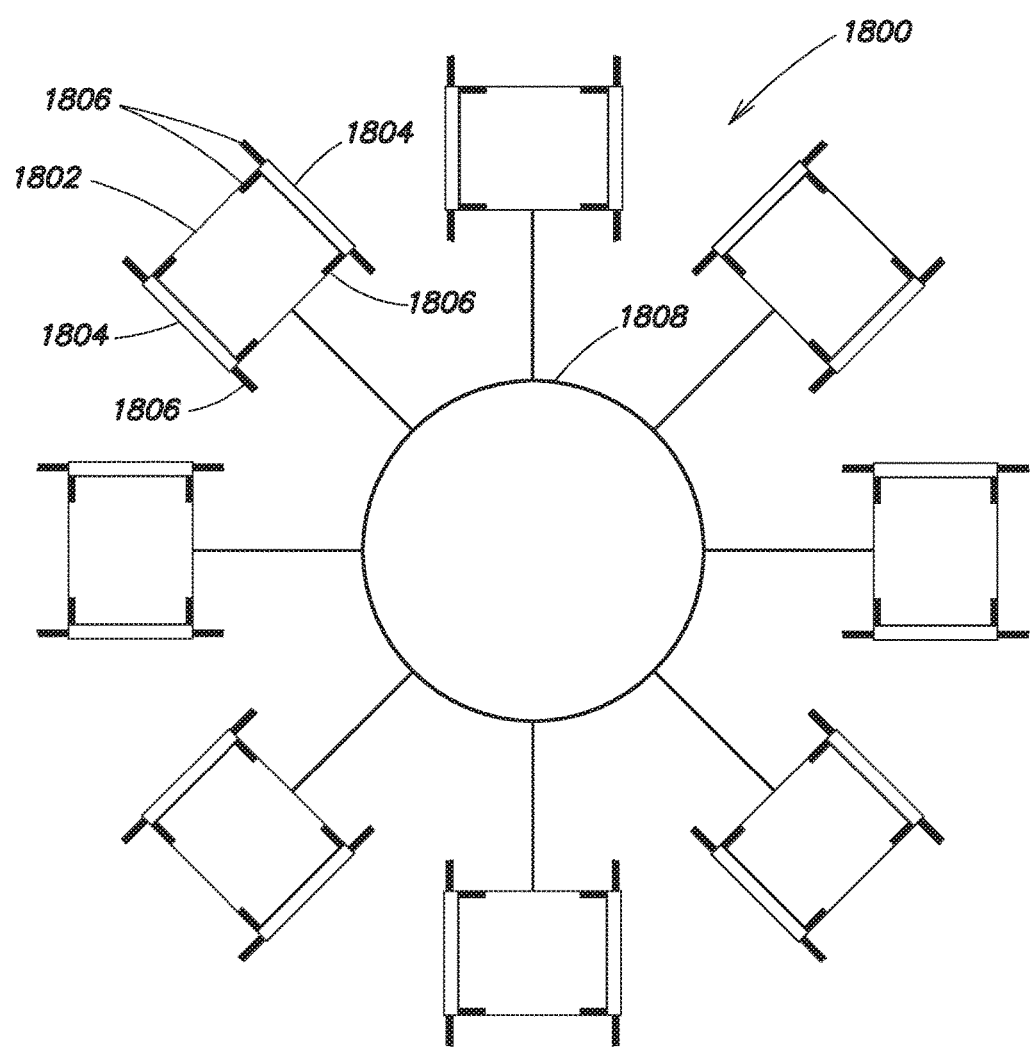
FIG. 18 is a diagram of another embodiment of a MEMS based gyroscope according to aspects of the present invention.

FIG. 18 is a diagram illustrating another embodiment of a MEMS based gyroscope 1800 configured according to aspects of the present disclosure. The gyroscope 1800 includes a plurality of masses 1802. Each mass 1802 is suspended between two shuttles 1804 via flexures 1806. Each mass is also coupled to a ring 1808. The gyroscope 1800 operates in substantially the same way as the gyroscope 100 discussed above with regard to FIG. 1 except that with the gyroscope 1800, the ring 1808 acts as the mass-to-mass coupler. FIG. 19 is a diagram illustrating further details of the mass 1802, shuttles 1804, and flexures 1806.

As discussed above, in certain embodiments, the MEMS based gyroscope includes eight masses; however, in other embodiments, the MEMS based gyroscope may include any number of masses. For example, in one embodiment, the MEMS based gyroscope includes any number of masses that is greater than eight and a multiple of four. As also discussed above, the MEMS based gyroscope includes wedge-shaped masses; however, in other embodiments, the masses may be configured in any appropriate shape capable of operating in the n=2 vibratory mode.

As discussed above, the MEMS based gyroscope is operated in an n=2 vibratory mode; however, in other embodiments, the MEMS based gyroscope may be operated in some other vibratory mode. For example, in at least one embodiment, the MEMS based gyroscope includes 12 masses and is configured to operate in the n=3 vibratory mode. In other embodiments, the MEMS based gyroscope may be configured to operate in any other vibratory mode (e.g., n=3 vibratory mode, n=4 vibratory mode, n=5 vibratory mode, etc.) and may include an appropriate number of masses.

A new MEMS based gyroscope design is provided that combines the best features of a lumped element TF gyroscope and a rotationally symmetric gyroscope. The new design efficiently uses relatively large masses (e.g., like a TF gyroscope) on relatively weak flexures to provide high sensitivity while maintaining an eight-fold symmetry conducive to the n=2 vibratory mode used in most whole angle based gyroscopes to provide high dynamic range. The new design is capable of operating in both rate and whole angle mode, is low cost, and is easily fabricated.

According to one embodiment, the MEMS based gyroscope design discussed above may be utilized as a whole angle gyroscope in a miniature system. In another embodiment, the MEMS based gyroscope may be utilized as a whole angle gyroscope in a platform having a high rotation rate that requires a high dynamic range instrument. The MEMS based gyroscope may be utilized in any other whole angle application.

The MEMS based gyroscope design could also be used in any application where traditional MEMS gyroscopes are currently used. The combination of large masses on weak springs (providing high momentum and low damping) and matched modes (providing high gain) yields a low Angle Random Walk (ARW), one of the primary performance parameters for gyroscopes. Applicant has appreciated that an ARW on the order of 0.01 deg/rt-hr will be obtained with this gyroscope design and improvement of 10x (or more) could be possible by increasing the size of the gyroscope.

Various embodiments of systems and methods disclosed herein may have applications in various fields. Applications may encompass the field of precision inertial guidance and navigation, particularly in GPS denied environments. For example, embodiments may be used to guide platforms such as strategic missiles, submarines, Unmanned Underwater Vehicles (UUV), Unmanned Aerial Vehicles (UAV), cruise missiles, aircraft, and tactical munitions. Other examples of applications may include commercial aviation, self-driving vehicles, robotic machinery, personal navigation and consumer electronics such as various computing devices and mobile communication devices.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A gyroscope comprising:
    an axially symmetric structure configured to vibrate in a first vibratory mode and a second vibratory mode; and
    a plurality of transducers configured to drive the axially symmetric structure and sense motion of the axially symmetric structure;
    wherein the plurality of transducers is configured to drive the axially symmetric structure in at least the first vibratory mode and the second vibratory mode, and
    wherein the gyroscope is implemented on a hexagonal monocrystalline substrate.

2. The gyroscope of claim 1, wherein each transducer is located at a periphery of the axially symmetric structure.

3. The gyroscope of claim 1, wherein at least one transducer is configured to electrostatically drive motion of the axially symmetric structure.

4. The gyroscope of claim 1, wherein at least one transducer is configured to magnetically drive motion of the axially symmetric structure.

5. The gyroscope of claim 1, wherein at least one transducer is configured to optically drive motion of the axially symmetric structure.

6. The gyroscope of claim 1, wherein at least one transducer is configured to piezoelectrically drive motion of the axially symmetric structure.

7. The gyroscope of claim 1, wherein at least one transducer is configured to thermally drive motion of the axially symmetric structure.

8. The gyroscope of claim 1, wherein the plurality of transducers is further configured to drive the axially symmetric structure in an n=2 vibratory mode.

9. The gyroscope of claim 8, wherein the first vibratory mode and the second vibratory mode are 45° apart.

10. The gyroscope of claim 8, wherein the plurality of transducers is further configured to drive motion of the axially symmetric structure at a fixed amplitude in the first vibratory mode and to sense motion of the axially symmetric structure in the second vibratory mode.

11. The gyroscope of claim 10, further comprising a controller coupled to the plurality of transducers,
wherein the plurality of transducers is further configured to provide signals to the controller based on the sensed motion of the axially symmetric structure in the second vibratory mode, and
wherein the controller is configured to calculate a rate of rotation of the gyroscope based on the signals.

12. The gyroscope of claim 8, wherein the plurality of transducers is further configured to drive motion of the axially symmetric structure such that a total vibrational energy is maintained across the first vibratory mode and the second vibratory mode and to sense a distribution of energy between the first vibratory mode and the second vibratory mode.

13. The gyroscope of claim 12, further comprising a controller coupled to the plurality of transducers,
wherein the plurality of transducers is further configured to provide signals to the controller based on the sensed distribution of motion between the first vibratory mode and the second vibratory mode, and
wherein the controller is configured to calculate an angle of rotation of the gyroscope based on the signals.

14. The gyroscope of claim 8, wherein the axially symmetric structure comprises:
a central anchor;
a plurality of internal flexures;
a plurality of masses, each mass coupled to the central anchor via at least one of the plurality of internal flexures and configured to translate in a plane of the gyroscope; and
a plurality of mass-to-mass couplers, each mass-to-mass coupler coupled between two adjacent masses of the plurality of masses,
wherein the plurality of transducers is configured to drive the plurality of masses in at least the first vibratory mode and the second vibratory mode.

15. The gyroscope of claim 14, wherein each mass-to-mass coupler includes a bar coupled to each adjacent mass via a flexural hinge, wherein the bar is configured to operate such that circumferential motion of one of the two adjacent masses of the plurality of masses to which it is coupled depends on radial motion of the other one of the two adjacent masses.

16. The gyroscope of claim 14, further comprising:
a plurality of outside anchors;
a plurality of outside shuttles, each located at a periphery of a corresponding one of the plurality of masses; and
a plurality of outside flexures;
wherein each mass of the plurality of masses is suspended between the central anchor and the plurality of outside anchors via the plurality of internal flexures and the plurality of outside flexures; and
wherein each one of the plurality of outside shuttles is configured to restrict rotation of its corresponding one of the plurality of masses.

17. The gyroscope of claim 16, wherein each one of the plurality of outside shuttles is further configured to decouple x- and y-motion of its corresponding one of the plurality of masses.

18. The gyroscope of claim 16, wherein each one of the plurality of outside shuttles is further configured to prevent force from being applied circumferentially to its corresponding one of the plurality of masses.

19. The gyroscope of claim 14, further comprising a plurality of internal shuttles, each one of the plurality of internal shuttles coupled between the central anchor and a corresponding one of the plurality of masses and configured to restrict rotation of its corresponding one of the plurality of masses.

20. The gyroscope of claim 19, wherein each one of the plurality of internal shuttles is further configured to decouple x- and y-motion of its corresponding one of the plurality of masses.

21. The gyroscope of claim 14, further comprising a plurality of angled electrodes, each angled electrode coupled to a corresponding one of the plurality of masses and configured to trim the cross spring term of the corresponding one of the plurality of masses.

22. The gyroscope of claim 21, wherein in trimming the cross spring term of its corresponding one of the plurality of masses, each angled electrode is configured to:
generate a radial force component in the second vibratory mode in response to a circumferential motion of its corresponding one of the plurality of masses in the first vibratory mode; and
generate a circumferential force component in the second vibratory mode in response to a radial motion of its corresponding one of the plurality of masses in the first vibratory mode;
wherein the radial force component and the circumferential force component are configured to either assist or oppose the vibration of the plurality of masses in the second vibratory mode to trim the cross spring term.

23. The gyroscope of claim 14, wherein the plurality of masses includes a plurality of wedge-shaped masses.

24. The gyroscope of claim 1, wherein the hexagonal monocrystalline substrate is a Silicon Carbide (SiC) based substrate.

25. The gyroscope of claim 24, wherein the hexagonal monocrystalline substrate is a 4H—SiC based substrate.

26. The gyroscope of claim 1, wherein the hexagonal monocrystalline substrate is oriented in the (0001) plane of a hexagonal crystal.

27. The gyroscope of claim 14, wherein the gyroscope has a thickness, and wherein the plurality of internal flexures includes flexures having a width that is at least five times narrower than the thickness of the gyroscope.

28. The gyroscope of claim 1, wherein the gyroscope is a Microelectromechanical System (MEMS) based gyroscope.

29. The gyroscope of claim 1, wherein the axially symmetric structure is one of a ring and a disk.

30. A gyroscope comprising:
an axially symmetric structure configured to vibrate in an n=2 vibratory mode of a rotationally symmetric gyroscope;
means for driving the axially symmetric structure in the n=2 vibratory mode; and
means for operating the gyroscope in a rate mode of operation or a whole angle mode of operation,
wherein the gyroscope is implemented on a hexagonal monocrystalline substrate.

31. The gyroscope of claim 30, further comprising means for decoupling radial and circumferential motion of each one of the plurality of masses.

32. The gyroscope of claim 30, further comprising means for trimming a cross spring term of the gyroscope.

* * * * *